United States Patent
McBride et al.

(10) Patent No.: US 12,516,935 B2
(45) Date of Patent: Jan. 6, 2026

(54) LOW POWER ATOMIC SENSOR

(71) Applicant: SRI International, Menlo Park, CA (US)

(72) Inventors: Sterling Eduardo McBride, Princeton, NJ (US); Alan M. Braun, Princeton, NJ (US); Seth Charles Caliga, Lafayette, CO (US)

(73) Assignee: SRI International, Menlo Park, CA (US)

( * ) Notice: Subject to any disclaimer, the term of this patent is extended or adjusted under 35 U.S.C. 154(b) by 308 days.

(21) Appl. No.: 18/041,053

(22) PCT Filed: Aug. 13, 2020

(86) PCT No.: PCT/US2020/046145
§ 371 (c)(1),
(2) Date: Feb. 8, 2023

(87) PCT Pub. No.: WO2022/035432
PCT Pub. Date: Feb. 17, 2022

(65) Prior Publication Data
US 2023/0296380 A1 Sep. 21, 2023

(51) Int. Cl.
*G01C 19/62* (2006.01)
*G01R 33/26* (2006.01)

(52) U.S. Cl.
CPC ............. *G01C 19/62* (2013.01); *G01R 33/26* (2013.01)

(58) Field of Classification Search
CPC ........ G01C 19/58; G01C 19/62; G01R 33/20; G01R 33/24; G01R 33/26; G04F 5/14
See application file for complete search history.

(56) References Cited

U.S. PATENT DOCUMENTS

| | | |
|---|---|---|
| 4,547,673 A | 10/1985 | Larsen et al. |
| 7,400,207 B2 | 7/2008 | Lipp et al. |
| 7,470,971 B2 | 12/2008 | Mcbride |
| 7,807,509 B2 | 10/2010 | Mcbride |
| 7,955,551 B2 | 6/2011 | Mcbride et al. |
| 8,080,778 B2 | 12/2011 | Mcbride |
| 8,405,021 B2 | 3/2013 | Anderson et al. |
| 8,415,612 B2 | 4/2013 | Mcbride et al. |

(Continued)

FOREIGN PATENT DOCUMENTS

WO 2019014330 A1 1/2019

OTHER PUBLICATIONS

"Ph 76 Advanced Physics Laboratory—Atomic Andoptical Physics—", Retrieved from: http://pmaweb.caltech.edu/~ph77/labs/optics/satabs1.pdf, Accessed on: May 9, 2023, 13 pp.
Han et al., "Microfabricated Vapor Cells with Reflective Sidewalls for Chip Scale Atomic Sensors", micromachines, Apr. 11, 2018, 19 pp.

(Continued)

*Primary Examiner* — Huy Q Phan
*Assistant Examiner* — David B Frederiksen
(74) *Attorney, Agent, or Firm* — Shumaker & Sieffert, P.A.

(57) ABSTRACT

An assembly includes one or more high temperature vapor cells positioned along an axis of the assembly, a vacuum envelope encasing the one or more high temperature vapor cells, and one or more sets of low thermal conductivity mounting structures coupled to the vacuum envelope. Each set of low thermal conductivity mounting structures is configured to position a corresponding one of the high temperature vapor cells within the vacuum envelope.

17 Claims, 12 Drawing Sheets

(56) References Cited

U.S. PATENT DOCUMENTS

| | | | |
|---|---|---|---|
| 10,509,369 B1 * | 12/2019 | Lemke | H03L 7/26 |
| 10,509,370 B1 * | 12/2019 | Lemke | G04F 5/14 |
| 2006/0022761 A1 | 2/2006 | Abeles et al. | |
| 2007/0247241 A1 | 10/2007 | Braun et al. | |
| 2007/0266784 A1 * | 11/2007 | Lust | G01C 19/62 |
| | | | 73/504.05 |
| 2010/0189605 A1 | 7/2010 | Schmid et al. | |
| 2011/0031969 A1 * | 2/2011 | Kitching | G01R 33/032 |
| | | | 324/304 |
| 2013/0035142 A1 | 2/2013 | Wolf, II | |
| 2014/0062608 A1 | 3/2014 | Ridley et al. | |
| 2015/0204899 A1 * | 7/2015 | Salit | G01P 15/12 |
| | | | 73/514.26 |
| 2015/0212168 A1 * | 7/2015 | Shah | G01N 24/006 |
| | | | 324/304 |
| 2016/0231395 A1 | 8/2016 | Foley et al. | |
| 2017/0331485 A1 * | 11/2017 | Gobet | G04F 5/14 |

OTHER PUBLICATIONS

International Preliminary Report on Patentability from International Application No. PCT/US2020/046145 dated Feb. 23, 2023, 10 pp.

International Search Report and Written Opinion of International Application No. PCT/US2020/046145 dated Nov. 6, 2020, 10 pp.

Limes et al., "Total-field atomic gradiometer for unshielded portable magnetoencephalography", arXiv:2001.03534v1, Jan. 7, 2020, 8 pp.

Tavarozzi et al., "Current perspective Magnetocardiography: current status and perspectives. Part I: Physical principles and instrumentation", Italian heart journal: official journal of the Italian Federation of Cardiology, Mar. 2002, pp. 75-85.

Tavarozzi et al., "Current perspective Magnetocardiography: current status and perspectives. Part II: Clinical applications", Italian heart journal: official journal of the Italian Federation of Cardiology, Apr. 2002, pp. 151-165.

* cited by examiner

LOW POWER ATOMIC SENSOR

GOVERNMENT RIGHTS

This invention was made with Government support under 140D6318C0020 awarded by DOI, Interior Business Center. The Government has certain rights in the invention.

This application is a national stage application under 35 U.S.C. § 371 of PCT Application No. PCT/US2020/046145, filed Aug. 13, 2020. The entire content of PCT Application No. PCT/US2020/046145 is incorporated herein by reference as if fully set forth below in its entirety and for all applicable purposes.

TECHNICAL FIELD

The disclosure relates to atomic sensors.

BACKGROUND

Atomic sensors may be used in atomic clocks, gyroscopes, magnetometers, interferometers, and other devices that precisely measure relatively small changes in parameters, such as time and acceleration. Atomic sensors use atomic spectroscopy and light-atom interactions to detect changes in properties of gas phase atoms and obtain precise measurements for parameters acting on the gas phase atoms. To dissociate alkali atoms into gas phase atoms and maintain thermal equilibrium of the gas phase atoms, atomic sensors may operate under high temperatures, and may consume large amounts of power to maintain these high temperatures.

SUMMARY

In general, this disclosure describes low power atomic sensors and techniques for reducing power consumption in atomic sensors. In various examples described herein, atomic sensors include one or more high temperature vapor cells encased by a vacuum envelope. The vacuum envelope may be configured to maintain a vacuum around the vapor cells to reduce convective heat loss from within the high temperature vapor cells to gas molecules in the vacuum envelope. To mechanically support and/or stabilize each vapor cell within the vacuum envelope, the atomic sensor includes one or more sets of mounting structures coupled to the vacuum envelope and configured to position the corresponding vapor cell within the vacuum envelope. Each set of mounting structures exhibits a low thermal conductivity to reduce conductive heat loss through the set of mounting structures. For example, the low thermal conductivity mounting structures may include a low thermal conductivity material, such as glass, and/or low surface area contact points, such as spheres or machined projections, to reduce conductive heat loss through the set of mounting structures to the vacuum envelope. In these various ways, atomic sensors described herein may reduce an amount of power consumed by the atomic sensor to heat the vapor cells.

In some examples, the one or more sets of mounting structures may mechanically support and stabilize the vapor cells within the atomic sensors. As one example, to maintain optical alignment of the vapor cells with various optical components interacting with the vapor cells, such as optics and photon sources, each set of low thermal conductivity mounting structures may include a rigid mounting structure and a flexible mounting structure contacting opposite axial ends of the vapor cell to rigidly position the vapor cell perpendicular to the axis (i.e. radially) and flexibly position the vapor cell along the axis (i.e., axially). In response to a force on the vapor cell, such as a drop, vibration, or thermal expansion, the flexible mounting structure may absorb the force to reduce displacement of the vapor cell compared to a fully rigid set of mounting structures. As another example, to further stabilize the vacuum envelope from distortion that may be caused by a change in pressure, the vacuum envelope may include a planar support extending across the vacuum envelope. The planar support may brace the vacuum envelope to maintain the position of the one or more high temperature vapor cells within the vacuum envelope. The planar support may also be coupled to the sets of low thermal conductivity mounting structures to position the one or more high temperature vapor cells on the planar support at a relatively central position, such that any dimensional changes in the vacuum envelope may results in less misalignment of components of the atomic sensor.

In some examples, atomic sensors described herein may include one or more components or structures to further reduce power consumption or robustness of the atomic sensors. As one example, to reduce radiative heat loss from the vapor cells, each of the high temperature vapor cells includes a radiation shield, such as one or more gold layers on a polymer substrate, to reduce radiative heat transfer from the vapors cells while permitting light from one or more optics to enter the vapor cells. The atomic sensor may include a getter assembly coupled to the vacuum envelope and configured to scavenge gas molecules in the vacuum envelope, to maintain a sufficient vacuum level to further reduce convective and conductive heat loss from the vapor cells. The atomic sensors may provide a complete assembly, such as by encasing a photon source and one or more optics in the vacuum envelope to emit light into the optics and transmit light into the vapor cells.

In one example, an assembly as described herein includes one or more high temperature vapor cells positioned along an axis of the assembly, a vacuum envelope encasing the one or more high temperature vapor cells, and one or more sets of low thermal conductivity mounting structures coupled to the vacuum envelope. Each set of low thermal conductivity mounting structures is configured to position a corresponding one of the high temperature vapor cells within the vacuum envelope.

In another example, a method for manufacturing an assembly as described herein includes coupling one or more sets of low thermal conductivity mounting structures to a vacuum envelope, positioning one or more high temperature vapor cells along an axis of the vacuum envelope using the one or more sets of low thermal conductivity mounting structures, and anodically bonding one or more walls of the vacuum envelope to encase the one or more high temperature vapor cells in the vacuum envelope.

In another example, a method for operating an assembly as discussed herein includes powering a heater of a high temperature vapor cell to heat a volume of the high temperature vapor cell to a vapor temperature. The high temperature vapor cell is positioned along an axis of a vacuum envelope using one or more sets of low thermal conductivity mounting structures coupled to the vacuum envelope. The method further includes powering a getter assembly to remove contaminants in the vacuum envelope to maintain a vacuum.

The details of one or more examples are set forth in the accompanying drawings and the description below. Other features, objects, and advantages of the disclosure will be apparent from the description and drawings, and from the claims.

DETAILED DESCRIPTION

In general, this disclosure describes robust, low power atomic sensors and techniques for reducing power consumption and maintaining mechanical stability of atomic sensors. Atomic sensors may be used in a variety of applications including, but not limited to, mobile applications, such as position, navigation and timing (atomic clocks and gyroscopes used to form an inertial-measurement unit for GPS-denied navigation), emerging bio-medical applications such as magnetocardiography and magnetoencephalography; power constrained applications, such as satellites; and the like.

Figure 1A:
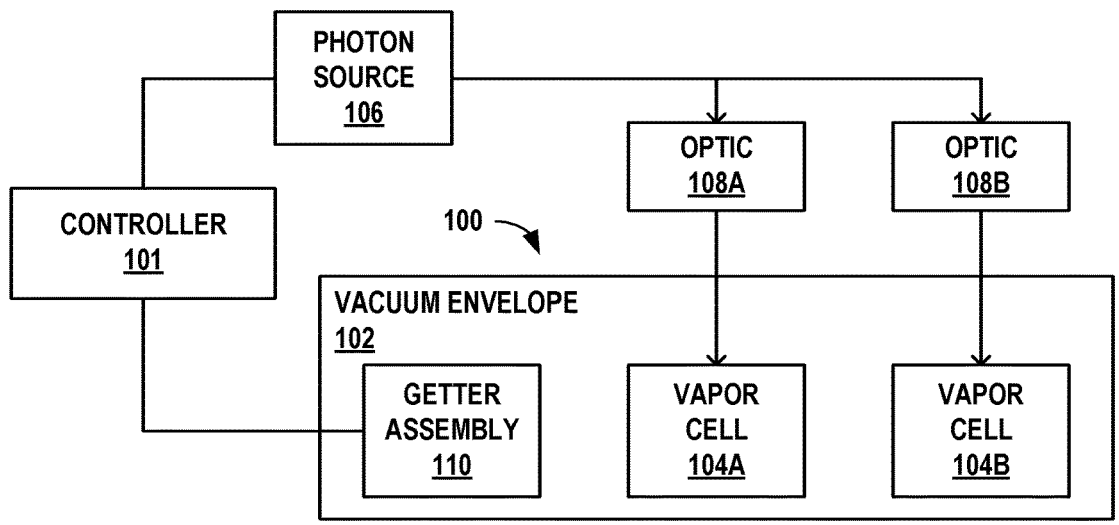
FIG. 1A is a block diagram illustrating an example atomic sensor, in accordance with examples discussed herein.

Example atomic sensors may include an assembly of one or more high temperature vapor cells. FIG. 1A is a block diagram illustrating an example atomic sensor that includes one or more high temperature vapor cells 104A and 104B, in accordance with examples discussed herein.

Assembly 100 includes one or more high temperature vapor cells 104A and 104B ("vapor cells 104" and "vapor cell 104"). In the example of FIG. 1A, assembly 100 includes two vapor cells 104A and 104B; however, in other examples, assembly 100 may include greater or fewer number of vapor cells 104. Each vapor cell 104 includes a cavity containing one or more components configured to dissociate into a vapor phase from a solid phase and maintain a thermal equilibrium to produce a particular density of the vapor phase in response to heat from a heat source of the respective vapor cell 104. In some examples, the cavity may include an alkali metal and corresponding alkali metal atomic vapor in thermal equilibrium, such as metallic cesium or other alkali metal, and a buffer gas, such as an inert buffer gas like argon, neon, or nitrogen, to confine the alkali metal atomic vapor within a volume of vapor cell 104. Vapor cells 104 may be configured to operate at relatively high temperatures at which the alkali metal atomic vapor may have sufficient density. In some examples, the temperature may be greater than 100° C., such as between about 100° C. and about 125° C. Each vapor cell 104 may include one or more heaters to heat a volume of the respective high temperature vapor cell 104 to a thermal equilibrium temperature.

In the example of FIG. 1A, assembly 100 includes one or more optics 108A and 108B ("optics 108" and "optic 108") positioned outside vacuum envelope 102. Each of optics 108 is configured to transmit light into a respective high temperature vapor cell 104. Optics 108 may be configured to receive light from a photon source 106 and direct the light into a cavity of each vapor cell 104 using one or more reflective or refractive optical surfaces. Optics 108 may include separate optical surfaces for redirecting different light from photon source 106, such as laser light from a pump laser or laser light from a probe laser, such that each vapor cell 104 may receive light from a plurality of optical surfaces. In some examples, optics 108 may be configured to receive a probe beam and a pump beam from orthogonal directions.

Assembly 100 includes photon source 106 positioned outside vacuum envelope 102. In the example of FIG. 1A, only a single photon source 106 is shown; however, in other examples, assembly 100 may include a greater number of photon sources 106, such as a photon source for each optic 108. Photon source 106 is configured to emit light into the one or more optics 108. Photon source 106 may include a variety of light sources, such as a laser, and optical assemblies, such as collimating optics, configured to emit light with specific properties into vapor cells 104. For example, photon source 106 may include a probe laser subassembly configured to emit a probe beam, a pump laser subassembly configured to emit a pump beam, and collimating optics configured to collimate the probe beam and/or pump beam. In some examples, at least a portion of photon source 106, such as a pump laser, may be encased in a vacuum housing to reduce thermal losses. For example, the pump laser may be operated at a higher power level than the probe laser, thereby producing relatively more heat, such that reducing convective heat loss by operating in a vacuum may provide a relatively high reduction in power compared to the probe laser.

In operation, the emitted light from photon source 106 may pump gas phase atoms in vapor cells 104 from a ground state to an optically excited state. The atoms fall back to the ground state from the excited state, such as by emission of fluorescent light or by quenching collisions with a buffer gas molecule. In some examples, a wavelength and/or a polarization of the light may be chosen such that some ground state sublevels are selectively depopulated, and other sublevels are overpopulated compared to a normal, substantially uniform distribution of atoms between the sublevels. The redistribution of atoms between the ground-state sublevels changes the transparency of the vapor, such that a different amount of light may pass through the vapor to a photodetector (not shown) that measures the transmission of light from the pump laser, or to photodetectors (not shown) that measure fluorescent light scattered out of the beam. Changes in the transparency of the vapor may be used as a measurement for a variety of applications, such as to lock an atomic clock or magnetometer to the Bohr frequencies of the vapor atoms.

To maintain a thermal equilibrium between gas phase atoms and solid atoms such that the gas phase atoms are present in a sufficient density, vapor cells 104 may operate at relatively high temperatures, such as greater than 100° C. However, an outside environment of assembly 100 may include substantially lower temperatures, such as room temperature. To reduce an amount of power supplied to the heaters to heat vapor cells 104, assembly 100 is configured to operate with low thermal losses caused by the temperature differential between vapor cells 104 and the outside environment of assembly 100 (e.g., convection and conduction) or by caused by the temperature of vapor cells 104 (e.g., radiation).

To reduce convective heat losses, assembly 100 may include vacuum envelope 102 encasing the one or more high temperature vapor cells 104. Vacuum envelope 102 may be substantially sealed to maintain a vacuum. For example, vacuum envelope 102 may include one or more walls anodically bonded to each other, such that relatively few gases from outside vacuum envelope 102 penetrate vacuum envelope 102 while under vacuum. By maintaining a vacuum in the volume of vacuum envelope 102, fewer gas particles may contact walls of vapor cells 104 to remove heat from the walls through convection as well, reducing thermal conduction losses from residual gas through the volume from the vapor cells to the ambient condition. In this way, assembly 100 may operate with reduced convective thermal losses compared to an atomic sensor that does not operate under a vacuum. In some examples, vacuum envelope 102 may be configured to operate under a pressure of less than about $1 \times 10^{-4}$ torr.

In some examples, vacuum envelope 102 may include a relatively small volume. To maintain a relatively small size of a vacuum envelope 102, various optical components, such as a photon source 106 and/or one or more optics 108A, 108B may be positioned outside vacuum envelope 102. For example, in the example of FIG. 1A, vapor cells 104 are encased in vacuum envelope 102, while other components of the atomic sensor, such as a photon source 106 and optics 108A and 108B ("optics 108") are positioned outside a vacuum envelope. By positioning components such as optics 108 and photon source 106 outside vacuum envelope 102, a volume of vacuum envelope 102 may be reduced. In some examples, an outer volume of vacuum envelope 102 may be less than about 100 cm$^3$, such as less than about 50 cm$^3$.

In some examples, vacuum envelope 102 may be substantially free of materials that may cause magnetic interference. For example, one or more walls of vacuum envelope 102 may be formed from silicon, Pyrex, or other materials that do not include substantial amounts of metals.

Figure 1B:
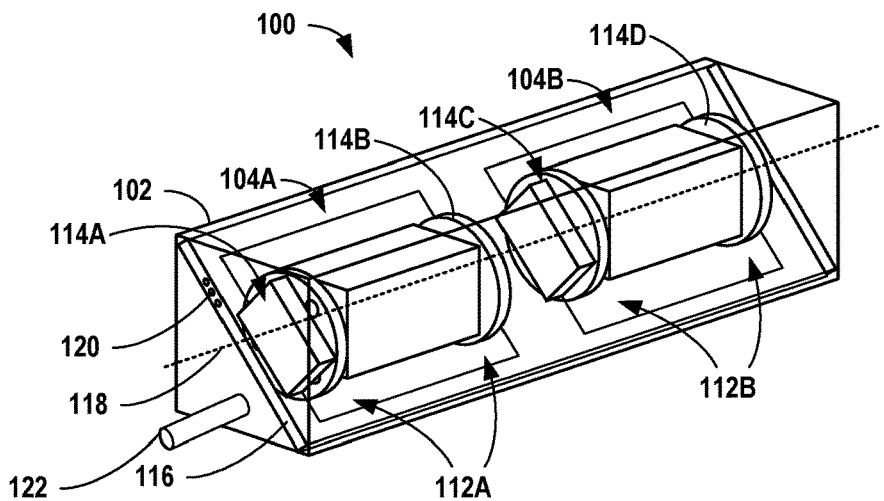
FIG. 1B is a perspective view diagram illustrating an example assembly of the example atomic sensor of FIG. 1A, in accordance with examples discussed herein.
Figure 1C:
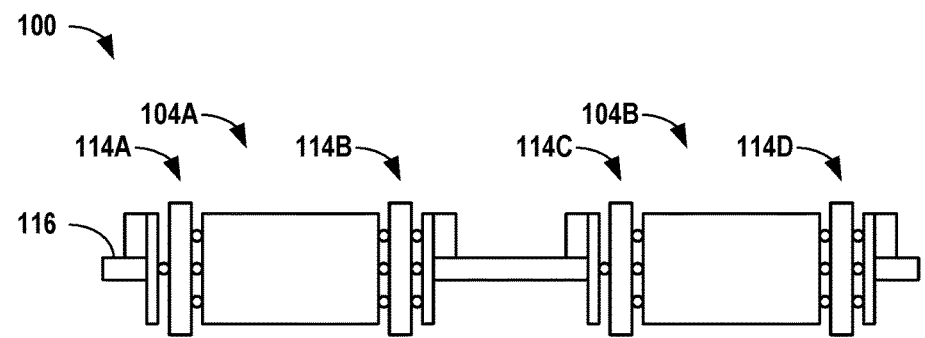
FIG. 1C is a side view diagram illustrating selected components of the example assembly of FIG. 1B, in accordance with examples discussed herein.
Figure 1D:
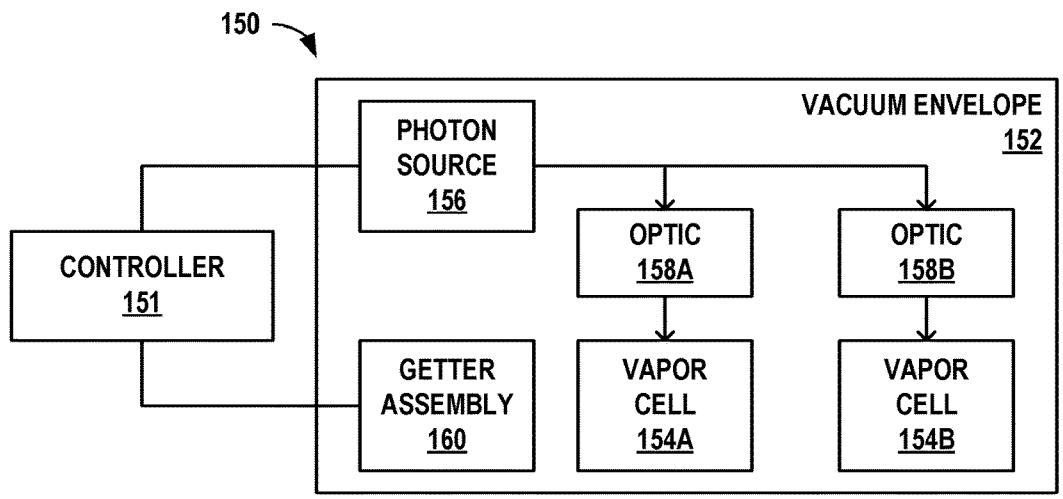
FIG. 1D is a block diagram illustrating an example atomic sensor, in accordance with examples discussed herein.

Prior to or during operation, contaminants, such as gas molecules or impurities, may be present within a volume of vacuum envelope 102. As one example, prior to use of assembly 100, a pressure within vacuum envelope 100 may be "tipped off" to a desired operating pressure, such as through a tip-off connection 122 (FIG. 1B). As another example, small leaks or particle out-gassing may permit gases to slowly enter vacuum envelope 102. To establish and/or maintain a vacuum inside vacuum envelope 102, assembly 100 may include a getter assembly 110 within a volume of vacuum envelope 102. In some examples, getter assembly 110 may be encased in a housing and connected to vacuum envelope 102, such as through tip-off connection 122; however, in other examples, getter assembly 110 may be positioned within a common vacuum envelope 152, such as illustrated in FIG. 1D. In the example of FIG. 1A, only a single getter assembly 110 is shown; however, in other examples, assembly 100 may include a greater number of getter assemblies 110.

Getter assembly 110 may be configured to scavenge gas molecules in vacuum envelope 102 to create and maintain a vacuum. To maintain the vacuum within vacuum envelope 102, getter assembly 110 may be configured to remove gases that enter vacuum envelope 102. For example, once vacuum envelope 102 has been tipped off, getter assembly 110 may maintain a pressure within vacuum envelope 102 of less than about $10^{-6}$ torr. A variety of getter assemblies may be used including, but not limited to, non-evaporative getters, titanium sublimation pumps, and the like. In some examples, getter assembly 110 may be a getter for alkali metals, and may include a substance that lowers the amount of the free, unbound alkali metal atoms available, e.g., by binding or interacting with the alkali metal atoms. In some examples, a getter for alkali metals may be a "metal," i.e., a substance having overlapping conductance bands and valence bands in its electronic structure. Getter assembly 110 may be coupled to one or more electrical feedthroughs 120 (FIG. 1B) of vacuum envelope 102 and configured to receive power through the one or more electrical feedthroughs 120. In some examples, getter assembly 110 may be powered by at least one of inductive heating, laser heating, or resistive heating.

To accurately measure changes in vapor cells 104 caused by photon source 106, vapor cells 104 may be rigidly positioned and secured within vacuum envelope 102, such that various movements and/or forces on vapor cells 104 may not substantially affect alignment of vapor cells 104. FIG. 1B is a perspective view diagram and FIG. 1C is a side view diagram illustrating assembly 100 of the example atomic sensor of FIG. 1A, in accordance with examples discussed herein. Assembly 100 includes one or more high temperature vapor cells 104 positioned along an axis 118 of assembly 100.

In some examples, a difference between the vapor temperature within vapor cells 104 and a temperature of an exterior of vacuum envelope 102 may be relatively high; for example, in a room temperature environment, the difference may be greater than about 40° C. While maintaining a vacuum within vacuum envelope 102 may reduce convective heat loss, vapor cells 104 may still contact vacuum envelope 102 to be securely positioned (e.g., mechanically supported) within vacuum envelope 102, resulting in conductive heat losses from vapor cells 104 to an exterior of vacuum envelope 102.

To reduce conductive heat losses from vapor cell 104 to an exterior of vacuum envelope 102, assembly 100 includes one or more sets of low thermal conductivity mounting structures 112A and 112B ("sets of mounting structures 112") coupled to vacuum envelope 102. In the example of FIG. 1B, a first set of low thermal conductively mounting structures 112A, which includes mounting structures 114A and 114B, is coupled to vapor cell 104A, and a second set of low thermal conductively mounting structure 112B, which includes mounting structures 114C and 114D ("mounting structures 114" or "mounting structure 114"), is coupled to vapor cell 104B. Each set of low thermal conductivity mounting structures 112 is configured to position a corresponding one of high temperature vapor cells 104 within the vacuum envelope 102.

Each set of mounting structures 112 includes one or more projections configured to contact an axial end of a corresponding vapor cell 104. The one or more projections may be configured to reduce an amount of conductive heat flux from vapor cells 104 to the exterior of vacuum envelope 102.

In some examples, to reduce a surface area of relatively high temperature surfaces (e.g., surfaces of vapor cells 104) within vacuum envelope 102, the one or more projections may be located at a position in a thermal flux path relatively close to vapor cells 104. For example, conductive heat loss may follow a thermal flux path from vapor cell 104 to a corresponding set of mounting structures 112, and to vacuum envelope 102. Surfaces of these components may have relatively high temperatures, and may be subject to relatively high convective heat losses. To reduce the surface area of relatively high temperature surfaces, the one or more projections may contact vapor cells 104 or a component (e.g., a support) proximate to vapor cells 104. For example, the one or more projections may be positioned within about 5 millimeters of vapor cell 104. In this way, high temperatures surfaces caused by heat produced by vapor cells 104 may be relatively confined to vapor cells 104.

In some examples, the one or more projections may be configured to have a relatively low contact area with vapor cells 104. For example, an amount of conductive heat flux leaving vapor cells 104 may be related to a contact area of vapor cells 104 with mounting structures 114. To reduce the contact area, the one or more projections may have physical properties, such as a number, a shape, and/or a contour, that result in reduced contact area with vapor cells 104. In some examples, the one or more projections includes at least one of spheres, cubes, pyramids, or other shapes having relatively curved or acute point contacts. In some examples, each set of low thermal conductivity mounting structures 112 may be configured to contact less than one percent of an outer surface area of the corresponding one of the high temperature vapor cells 104 or vapor cell assemblies that include structures (e.g., supports) contacting vapor cells 104. For example, vapor cells 104 may be coupled to other structures that form a vapor cell assembly.

In some examples, the one or more projections may be unfixed to a corresponding mounting structure 114. For example, the one or more projections may include beads or other discrete objects configured to fit in slots or recesses between a support of mounting structure 114 and vapor cell 104. As will be described further below, by having the one or more projections relatively unfixed, the one or more projections may be configured to move relative to supports of mounting structure 114 in response to movement of mounting structure 114 and/or vapor cells 104 and/or reduce conductive efficiency at the interface between the one or more projections and the one or more cavities. In some examples, the one or more projections may be fixed to a corresponding mounting structure 114. For example, mounting structure 114 may include one or more projections adhered to or machined into a surface of mounting structure 114, such that the one or more projections may not move relative to support of mounting structure 114 in response to movement of mounting structure 114.

In some examples, the one or more projections may be configured to include a material at the contact surface having a relatively low thermal conductivity (high thermal resistivity). For example, an amount of conductive heat flux leaving vapor cells 104 may be related to the composition of the material at the contact area of vapor cells 104 with mounting structures 114, such that by including insulative materials or surfaces having a relatively low conductivity, an amount of conductive thermal flux through the contact area may be reduced. A variety of materials may be used for the one or more projections including, but not limited to, glass, quartz, silicon, and the like. The one or more projections may be formed from a material having a relatively low thermal conductivity, such as less than about two W/cm*K at 100° C. While the one or more projections have been described as being part of mounting structure 114, in some examples, the one or more projections may be attached to or integrated with vapor cells 104. For example, axial surfaces of vapor cells 104 may include the one or more projections, such as machined surfaces.

As mentioned above in FIG. 1A, vacuum envelope 102 may operate at relatively low pressures. While establishing or maintaining a vacuum, vacuum envelope 102 may be subject to various inward forces due to the low pressure of the vacuum, which may distort or otherwise change one or more dimensions of vacuum envelope 102 if left unsupported. These distortions may cause misalignment of optically aligned components of the atomic sensor, such as vapor cells 104, optics 108, and/or photon source 106. In some examples, to support vacuum envelope 102, vacuum envelope 102 includes a planar support 116 extending along axis 118 of assembly 100 and across axis 118 of assembly 100. Planar support 116 may be configured to extend between two or more walls of vacuum envelope 102. In some examples, planar support 116 is a mid-plane planar support coupled to each perimeter wall of vacuum envelope 102. By supporting vacuum envelope 102, planar support 116 may assist in aligning optical components of the atomic sensor, such as photon source 106 and/or optics 108. For example, while not shown in FIG. 1B, optics 108 may be positioned on an outside of vacuum envelope 102, such that changes in dimensions of vacuum envelope 102 may shift directionality, and thus alignment, of optics 108. In addition or alternative to supporting vacuum envelope 102, planar support 116 may provide a radially (e.g., within a plane of axis 118) central surface upon which to attach components of assembly 100. In the example of FIG. 1B, the one or more sets of low thermal conductivity mounting structures 114 are configured to position the one or more high temperature vapor cells 104 on planar support 116, such that mounting structures 114 are positioned within slots of planar support 116. In these various ways, planar support 116 may functional as a rigid optical bench for one or more optical components of the atomic sensor 102.

In some examples, vacuum envelope 102, planar support 116, mounting structures 114, and/or any other structures having a substantial dimension (e.g., greater than 10 mm) along axis 118 (e.g., "axial structures") may be composed of materials having a relatively low coefficient of thermal expansion. For example, various portions of vacuum envelope 102, planar support 116, and/or mounting structures 114, even with reduced thermal losses from vapor cells 104, may undergo changes in temperature. To reduce an amount of stress resulting from a change in temperature, vacuum envelope 102, planar support 116, mounting structures 114, and/or the other axial structures may be composed of materials having a low coefficient of thermal expansion, such as less than about 3 ppm/° C. and/or materials having substantially similar coefficients of thermal expansion. In some examples, vacuum envelope 102, planar support 116, mounting structures 114, and/or vapor cells 104 may be substantially free of materials that may cause magnetic interference. For example, one or more walls of vacuum envelope 102 may be formed from silicon, Pyrex, or other materials that do not include substantial amounts of metals.

In some examples, vacuum envelope 102 includes an electrical feedthrough interface 120 that includes one or more electrical feedthroughs extending through a wall of vacuum envelope 102. Various components within vacuum envelope 102, such as heaters of vapor cells 104, may require electrical power to operate. To provide these components with power while maintaining a vacuum, electrical feedthrough interface 120 may include conductive, doped sections to electrically couple components within vacuum envelope 102 with components, such as electronics (not shown) outside vacuum envelope 102. In some examples, the one or more electrical feedthroughs may include doped silicon with contacts that include copper or gold alloys, such as copper beryllium (BeCu) or gold beryllium (BeAu).

In some examples, in addition to encasing vapor cells, assemblies described herein may include vacuum envelopes that encase other components of an atomic sensor. FIG. 1D is a block diagram illustrating an example atomic sensor, in accordance with examples discussed herein. Unless otherwise indicated, a vacuum envelope 152, vapor cells 154A and 154B, a photon source 156, optics 158A and 158B, and a getter assembly 160 may be structurally and/or functionally similar to vacuum envelope 102, vapor cells 104A and 104B, photon source 106, optics 108A and 108B, and getter assembly 110 of FIG. 1A.

As illustrated in FIG. 1D, assembly 150 includes vacuum envelope 152 encasing vapor cells 154A and 154B ("vapor cells 154" and "vapor cell 154"), photon source 156, optics 158A and 158B ("optics 158" and "optic 158"), and getter assembly 160. By integrating these components into a single rigid unit, assembly 150 may be relatively robust compared to assemblies that include components positioned on an outside of the assembly.

Figure 1E:
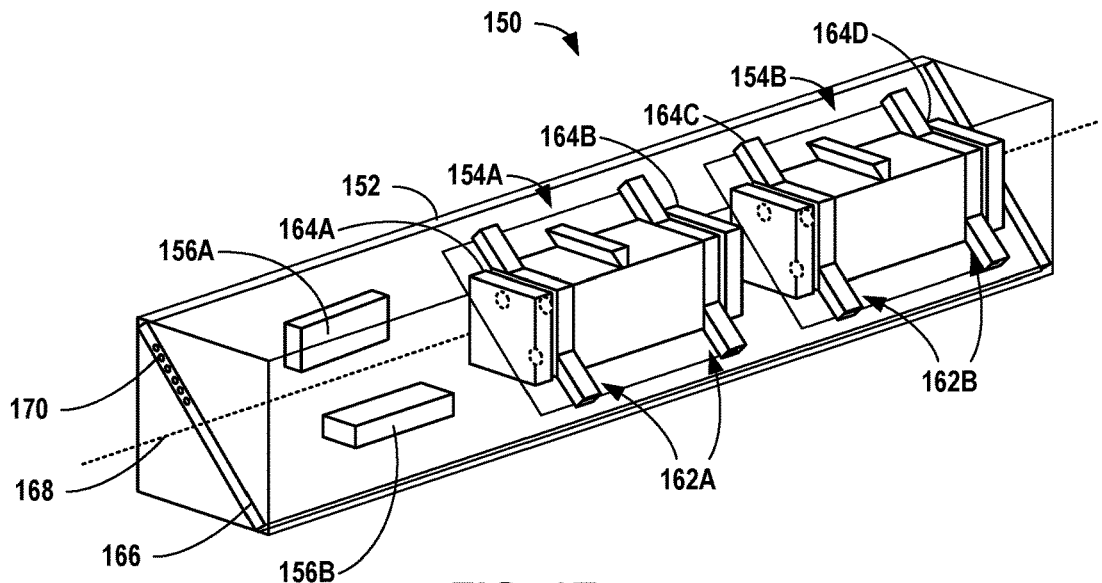
FIG. 1E is a perspective view diagram illustrating an example assembly of the example atomic sensor of FIG. 1D, in accordance with examples discussed herein.
Figure 1F:
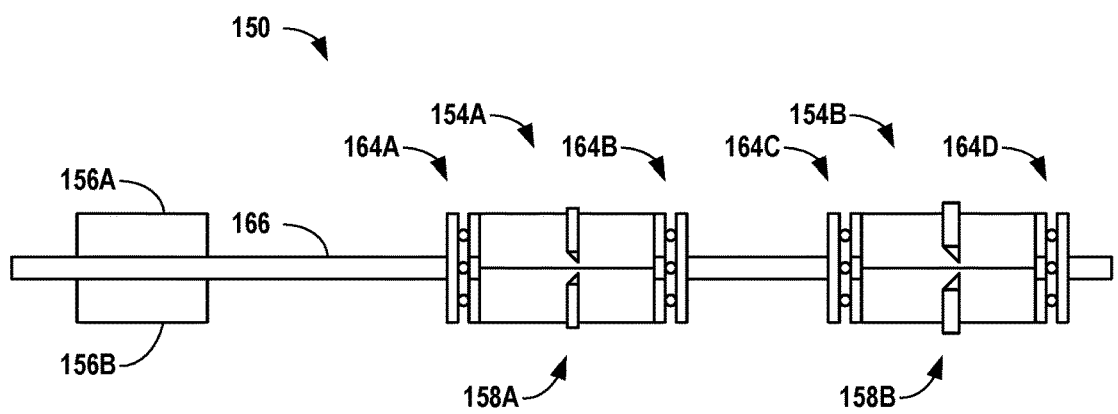
FIG. 1F is a side view diagram illustrating selected components of the example assembly of FIG. 1E, in accordance with examples discussed herein.

FIG. 1E is a perspective view diagram and FIG. 1F is a side view diagram illustrating an example assembly 150 of the example atomic sensor of FIG. 1D, in accordance with examples discussed herein. Unless otherwise indicated, sets of low thermal conductivity mounting structures 162A and 162B ("sets of mounting structures 162"), low thermal conductivity mounting structures 164A, 164B, 164C, 164D ("mounting structures 164" and "mounting structure 164"), planar support 166, axis 168, and electrical feedthrough interface 170 may be structurally and/or functionally similar to sets of low thermal conductivity mounting structures 112A and 112B, low thermal conductivity mounting structures 114A, 114B, 114C, 114D, planar support 116, axis 118, and electrical feedthrough interface 120 of FIG. 1A. In the examples of FIGS. 1E and 1F, optics 158 may be coupled to an exterior of vapor cells 154 and placed within radiation shielding (not shown). By positioning optics 158 within vacuum envelope 152, optics 158 may be relatively small compared to optics positioned further from vapor cells 154. Photon sources 156A and 156B may be coupled to planar support 166 and aligned with optics 158. By positioning photon sources 156A and 156B within vacuum envelope 152, convective heat losses from heat generated by photon sources 156A and 156B may be reduced and as well, low thermal conductive supporting structures can be implemented to provide an optimal thermal loss for the photon sources.

Components of atomic sensors described herein, such as photon sources 106 and 156 and getter assemblies 110 and 160 shown in FIGS. 1A and 1D, may be operated by one or more controllers 101 or 151. Each of controllers 101 and 151 may be configured to control photon sources 106 and 156 and/or getter assemblies 110 and 160 to emit light into vapor cells 104 and 154 and maintain a vacuum of vacuum envelopes 102 and 152. For example, controllers 101 and 151 may include a variety of processing components including, but not limited to, one or more processors, including one or more microprocessors, digital signal processors (DSPs), application specific integrated circuits (ASICs), field programmable gate arrays (FPGAs), or any other equivalent integrated or discrete logic circuitry (e.g., control circuitry), as well as any combinations of such components.

Figure 2A:
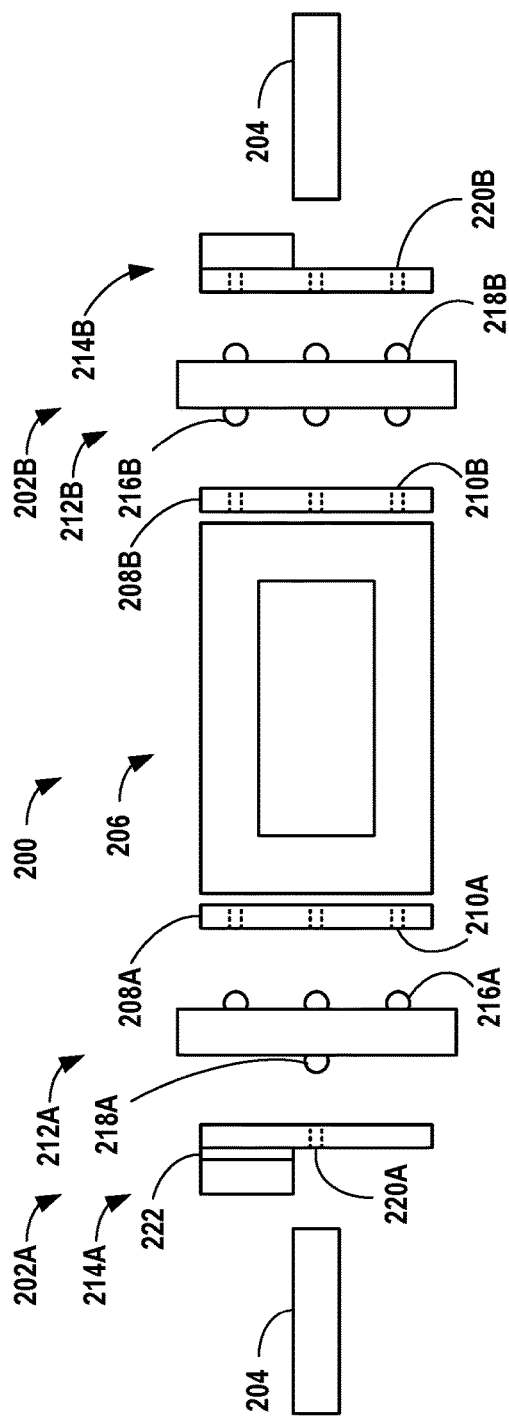
FIG. 2A is a side view diagram illustrating an example vapor cell and set of mounting structures, in accordance with examples discussed herein.

Example assemblies described herein, such as assemblies 100 and 150 of FIGS. 1A-1F, may securely position and support vapor cells within a vacuum envelope. For example, forces acting upon assemblies, such as resulting from a drop, vibration, or thermal expansion, may be absorbed and/or damped by mounting structures coupled between the vacuum envelope and the vapor cells to reduce displacement of the vapor cells with the vacuum envelope and maintain alignment of the vapor cells with various optical components, such as optics and/or photon sources. FIG. 2A is an expanded side view diagram illustrating an example vapor cell assembly 200 and sets of mounting structures 202A and 202B ("mounting structures 202" and "mounting structure 202"), in accordance with examples discussed herein. Each set of mounting structures 202A and 202B may be configured to position vapor cell assembly 200 using complementary sets of projections and cavities, or combinations thereof. As such, while FIG. 2A will be described with respect to components of mounting structures 202 and vapor cell assembly 200 as having projections or cavities, the positions of the projections and cavities for two complementary surfaces may be reversed or combined in any configuration.

Vapor cell assembly 200 includes a vapor cell 206 (e.g., vapor cell 104 of FIGS. 1A-1F) and one or more vapor cell supports 208A and 208B ("vapor cell support 208" and "vapor cell support 208"). Each vapor cell support 208 includes a first set of cavities 210A or 210B ("first set of cavities 210"), such that each axial end of high temperature vapor cell assembly 200 includes the first set of cavities 210. However, in other examples, vapor cell support 208 may be directly machined into vapor cell 206. In some examples, vapor cell support 208 may be directly coupled to vapor cell 206, such as through an adhesive or other mounting structure or material.

Each high temperature vapor cell assembly 200 is positioned within a vacuum envelope (e.g., vacuum envelope 102 of FIGS. 1A-1F) by a set of low thermal conductivity mounting structures 202. For example, as described with respect to mounting structures 114 of FIGS. 1A-1F, each mounting structure 202 may have a relatively low thermal conductivity. In the example of FIG. 2A, each mounting structure 202 includes a support 214A or 214B ("supports 214" and "support 214") coupled to a vacuum envelope (e.g., vacuum envelope 102 of FIGS. 1A-1F) and a mount 212A or 212B ("mounts 212" and "mounts 212") contacting high temperature vapor cell assembly 200 and a corresponding support 214.

In some examples, each mounting structure 202 is configured to contact vapor cell assembly 200 using a recessed fit. Each support 214 includes an axial surface comprising a second set of cavities 220A or 220B ("second set of cavities 220"). Each mount 212 includes a first axial surface that includes a first set of projections 216A or 216B ("first set of projections 216A") configured to interface with the first set of cavities 210 of high temperature vapor cell assembly 200 and a second axial surface that includes a second set of projections 218A or 218B ("second set of projections 218") configured to interface with the second set of cavities 220 of the corresponding support 214.

In some examples, the first and second sets of projections 216 and 218 and the first and second sets of cavities 210 and 220 may be configured to securely position vapor cell assembly 200 to planar support 204. For example, a number, a shape, and/or a contour of the first and second sets of projections 216 and 218 and/or the first and second set of cavities 210 and 220 may be configured to resist axial, radial, and/or rotational movement of vapor cell assembly 200 with respect to planar support 204. As one example, both axial surfaces of mount 212B may include a plurality of projections 216B and 218B have a number or shape sufficient to resist rotation of vapor cell assembly 200 with respect to planar support 204. In some examples, the plurality of projections may include at least three projections. To further reduce contact area, one axial surface of mount 212A may include a single projection 218A. As another example, each axial surface of mounts 212 may include projections to resist radial displacement of vapor cell assembly 200. For example, a shape and/or contour of the first and second sets of projections 216 and 218 may result in relatively small clearances with the first and second sets of cavities 210 and 220, such that mounts 212 may not substantially move radially with respect to supports 208 or 214.

In some examples, one or more mounting structures 202 may be relatively flexible in an axial direction to resist displacement of vapor cells assemblies 206 in response to axial forces acting upon vapor cell assembly 200. In the example of FIG. 2A, each set of low thermal conductivity mounting structures 202 includes a flexible mounting structure 202A contacting a first axial end of high temperature vapor cell assembly 200 and a rigid mounting structure 202B contacting a second axial end of high temperature vapor cell assembly 200. Flexible mounting structure 202A is configured to be relatively flexible compared to rigid mounting structure 202B, such that flexible mounting structure 202A may be more likely to compress in response to an axial force than rigid mounting structure 202A. For example, support 214A of flexible mounting structure 202A may include a compressive material 222 configured to exert a stabilizing axial force against mount 212A that maintains contact between support 214A and mount 212A to absorb shock received by vapor cell assembly 200. In some examples, flexible mounting structure 202A may utilize beam deflection of a thin glass substrate to exert an a stabilizing axial force. In these various ways, mounting structures 202 may position vapor cell assembly 200 in a vacuum envelope with reduced displacement compared to assemblies that include fully rigid mounting structures.

Figure 2B:
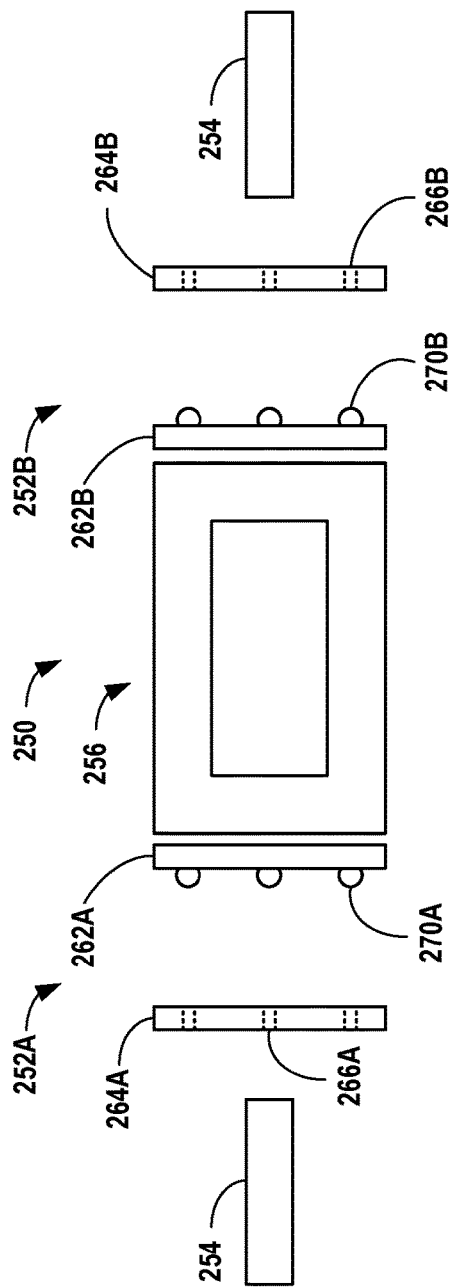
FIG. 2B is a side view diagram illustrating an example vapor cell and set of mounting structures, in accordance with examples discussed herein.

FIG. 2B is an expanded side view diagram illustrating an example vapor cell assembly 250 and set of mounting structures 252A and 252B, in accordance with examples discussed herein. Each set of mounting structures 252A and 252B ("mounting structures 252" and "mounting structure 252") may be configured to position vapor cell assembly 250 using complementary projections and cavities.

Vapor cell assembly 250 includes a vapor cell 256 (e.g., vapor cell 104 of FIGS. 1A-1F). Vapor cell assembly 250 is positioned within a vacuum envelope (e.g., vacuum envelope 102 of FIGS. 1A-1F) by set of low thermal conductivity mounting structures 252. In contrast to the example of FIG. 2A, vapor cell assembly 250 and mounting structures 252 include a single set of complementary projections and cavities on each axial side of vapor cell assembly 250 (e.g., one set of projections 270A and 270B and one set of cavities 266A and 266B), rather than two sets of complementary projections and cavities on each axial side.

In the example of FIG. 2B, each mounting structure 252 includes a support 264A or 264B ("supports 264" and "support 264") coupled to a vacuum envelope (e.g., vacuum envelope 102 of FIGS. 1A-1F) and a mount 262A or 262B ("mounts 262" and "mount 262") contacting high temperature vapor cell assembly 250 and a corresponding support 254. However, in other examples, supports 264 may be directly machined into vapor cell 256. For example, a set of projections 270A and 270B may be directly machined into an axial surface of vapor cell 256. In some examples, supports 264 may be directly coupled to vapor cell 256, such as through an adhesive or other mounting structure or material.

Vapor cell assembly 250 and mounting structures 252 may be configured to be relatively simple to assemble within planar support 254. For example, to couple mounting structures 252 to planar support 254, mounting structures 252 may be axially aligned and stacked to sequentially position mount 262A, support 264A, vapor cell 256, support 264B, and mount 262B. A slot in planar support 254 may be sized such that mounting structures 252 and vapor cell assembly 250 fit within the slot with a relatively small amount of axial movement. For example, a length (e.g., along an axis) of the slot may be substantially equal to a cumulative length of vapor cell 256 and thickness of mounting structures 252.

Example assemblies for atomic sensors may include vapor cells configured with a low profile. This low profile may reduce a surface area, and therefore reduce convective radiative and heat losses, of the vapor cells and/or reduce a volume of a vacuum envelope encasing the vapor cells. FIG.

3A is a perspective view diagram illustrating an example vapor cell 300, in accordance with examples discussed herein.

In some examples, vapor cell 300 may include a monolithic frame 302 and one or more windows 304 anodically bonded to frame 302. Windows may contain thin film coatings for reflective or anti-reflective (transmissive) properties. For example, to anodically bond windows 304 to frame 302, an outer substrate may be deposited on frame 302 and windows 304 to enclose the cavity and form a bonding interface. A variety of materials may be used for form vapor cell 300 including, but not limited to, silicon, glasses such as Pyrex, and the like. In some examples, vapor cell 300 may include a relatively high resistivity silicon.

Each vapor cell 300 includes one or more heaters to heat a volume of the respective high temperature vapor cell 300 to a vapor temperature. A variety of heaters may be used including, but not limited to, platinum heaters, Kapton heaters, and the like. In some examples, the heaters may be configured to heat an element in the cavity to a vapor temperature greater than about 100° C.

Vapor cell 300 may have a relatively small size to reduce power consumption as compared to larger devices, as relatively small heaters may be used to heat the cavity. In some examples, the cavity may have an inner, lateral dimension between about 100 micrometers and about 1 centimeter. In some examples, an outer volume of each high temperature vapor cell 300 is less than about 5 cm$^3$. In some examples, the cavity may have an internal volume between about one nanoliter and about one microliter. In some examples, a power consumption is less than about 200 mW.

In some examples, vapor cell 300 may be configured to reduce convective heat loss from vapor cell 300. For example, convective and radiative heat loss from vapor cell 300 may be related to an outer surface area of vapor cell 300. To reduce power consumption, vapor cell 300 may be configured with a relatively small surface area for a particular volume of the cavity of vapor cell 300. For example, an internal volume of the cavity of vapor cell 300 may be controlled by the physics involved in vapor cell 300, such as a minimum size. Vapor cell 300 may have a height and width that results in a relatively small surface area for a given volume of the cavity of vapor cell 300. In some examples, a height (e.g., aligned with an axis of an assembly) of vapor cell 300 may be similar to a width and length of vapor cell 300. For example, a height of vapor cell 300 may be less than twice a length and width of vapor cell 300. In some examples, a thickness of frame 302 and/or windows may be relatively small to reduce a surface area of vapor cell 300 for a particular volume. For example, a difference between an outer dimension (e.g., a height, width, or length) of vapor cell 300 and a corresponding inner dimension (e.g., a height, width, or length of the cavity of vapor cell 300) may be relatively small, resulting in a lower surface area and corresponding lower heat loss due to convection and radiative power loss.

Figure 3A:
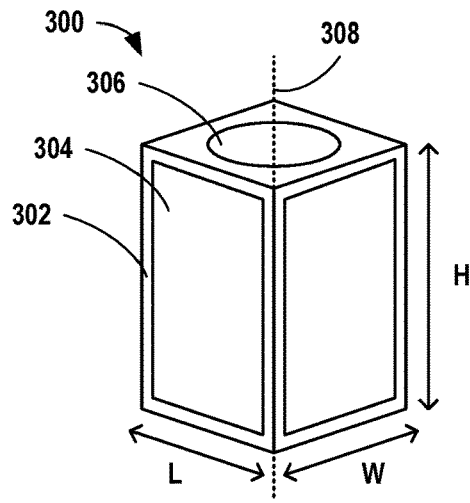
FIG. 3A is a perspective view diagram illustrating an example vapor cell, in accordance with examples discussed herein.
Figure 3B:
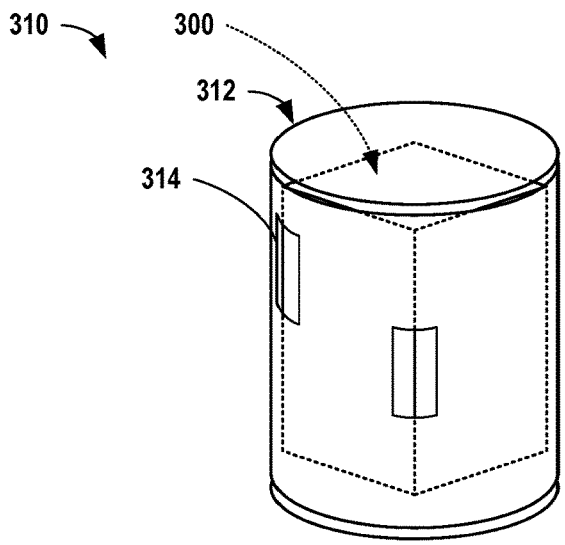
FIG. 3B is a perspective view diagram illustrating an example shielded vapor cell, in accordance with examples discussed herein.
Figure 3C:
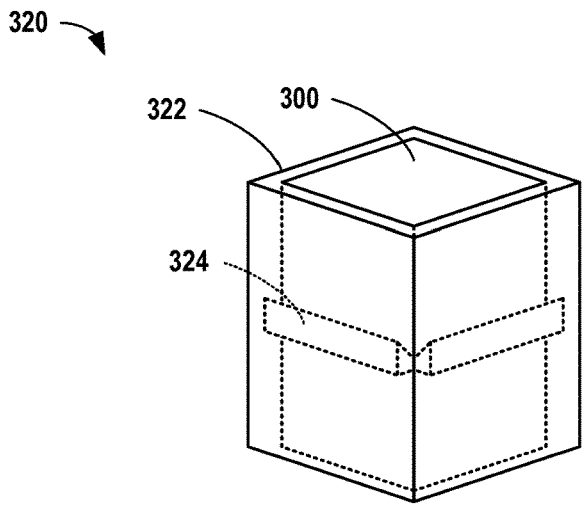
FIG. 3C is a perspective view diagram illustrating an example shielded vapor cell, in accordance with examples discussed herein.

In some examples, vapor cell 300 may be partially or fully surrounded by a radiation shield to reduce radiative heat loss from vapor cell 300. FIGS. 3B and 3C illustrate different configurations of radiation shields 312, 322 to reduce thermal energy radiating from the cells. Vapor cell 300 may have a relatively high operating temperature (e.g., greater than 100° C.). To reduce an amount of heat lost due to radiation, radiation shields 312, 322 surrounding vapor cell 300 may include a reflective, low emissivity material that reduces radiative heat loss from vapor cell 300 to an exterior of a vacuum envelope (e.g., vacuum envelope 102 of FIG. 1A) in which vapor cell 300 is positioned. In some examples, the low emissivity material has a thermal emissivity of less than about 0.03. A variety of low thermal emissivity materials can be used including, but not limited to, gold, silver, and aluminum, and the like. In some examples, radiation shields 312 or 322 may include one or more low emissivity layers on a backing substrate. For example, radiation shields 312 or 322 may include one or more gold layers on a polymer substrate, such as Kapton films, or glass plates, with one or more layers of gold metal coatings on both sides.

FIG. 3B is a perspective view diagram illustrating an example cylindrically shielded vapor cell 310, in accordance with examples discussed herein. Shielded vapor cell 310 includes radiation shield 312 surrounding vapor cell 300. For example, vapor shield 312 may include a lateral portion wrapped around vapor cell 300 and axial portions positioned at each end of vapor cell 300. Radiation shield 312 includes one or more openings 314 configured to receive light from one or more optics (e.g., optics 108 of FIG. 1A).

FIG. 3C is a perspective view diagram illustrating an example block shielded vapor cell 320, in accordance with examples discussed herein. Shielded vapor cell 320 includes radiation shield 322 partially surrounding vapor cell 300. For example, radiation shield 322 may include multiple panels, with each panel positioned at a side and end of vapor cell 300 such that vapor cell 300 may be substantially surrounded by radiation shield 322 once the panels are positioned. In the example of FIG. 3C, radiation shield 322 may be offset from vapor cell 300 to accommodate one or more optics 324 between vapor cell 300 and radiation shield 322. Optics 324 may be configured to redirect light within a vacuum envelope (e.g., vacuum envelope 152 of FIG. 1E). For example, rather than including openings 314 in lateral portions of radiation shield 312, as shown in FIG. 3B, radiation shield 322 may include axial openings that permit light to reflect off optics 324 into vapor cell 300.

Figure 4A:
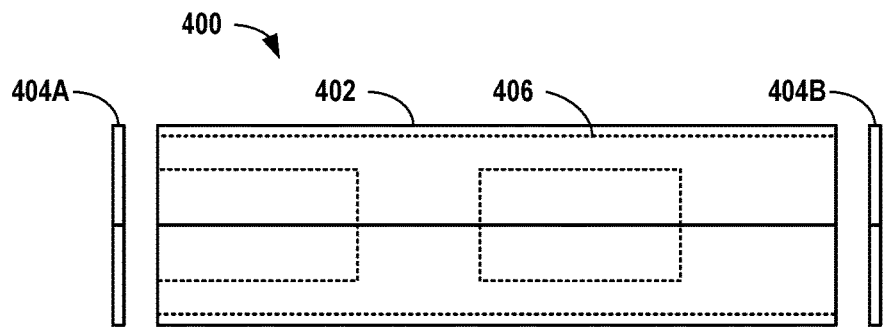
FIG. 4A is a side view diagram illustrating an example vacuum envelope of an example assembly, in accordance with examples discussed herein.

Assemblies described herein may be configured to FIG. 4A is a side view diagram illustrating an example vacuum envelope 400 of an example assembly, in accordance with examples discussed herein. Vacuum envelope 400 includes a vacuum envelope frame 402, a first axial end 404A, and a second axial end 404B. In some examples, vacuum envelope 400 may only include a single separate axial end (e.g., axial end 404A), such that a second axial end (e.g., axial end 404B) may be monolithic with vacuum envelope frame 402. Vacuum envelope 400 may be configured such that internal components of an assembly (e.g., assemblies 100 or 150 of FIGS. 1A-1F) may be positioned within vacuum envelope 400. For example, rather than joining lateral walls of an envelope around components, vacuum envelope frame 402 may be formed separately, and the components may be positioned on a planar support 406 (e.g., vapor cells 104 and 154 of FIGS. 1A and 1D) and positioned within vacuum envelope frame 402.

Figure 4B:
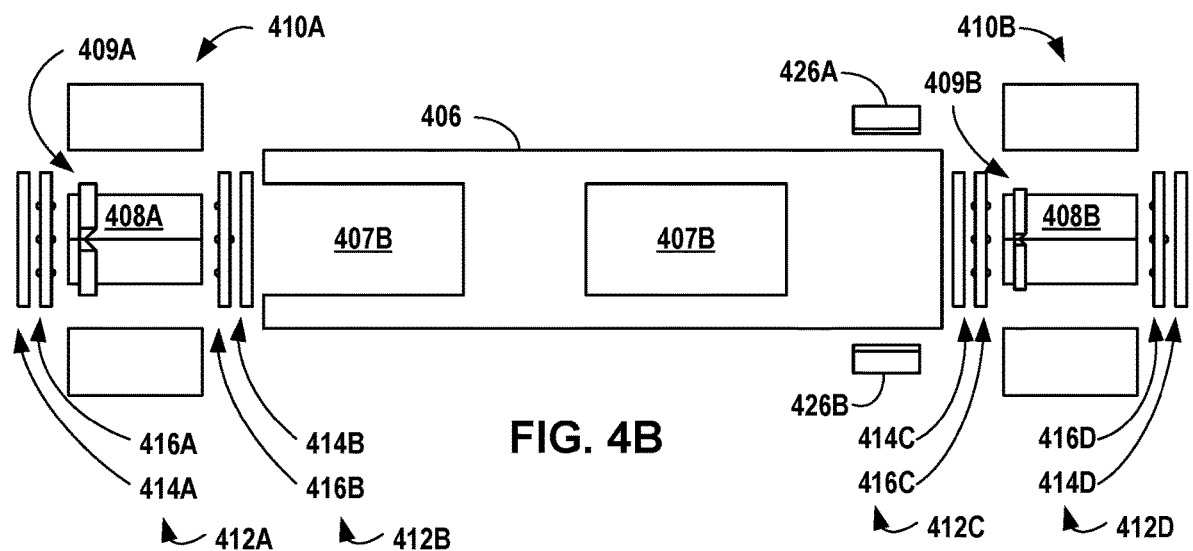
FIG. 4B is a side view diagram illustrating example internals of an assembly, in accordance with examples discussed herein.

FIG. 4B is a side view diagram illustrating example internal components of an assembly, in accordance with examples discussed herein. In some examples, vacuum envelope 400 includes a planar support 406. Planar support 406 includes a first, open slot 407A and a second, closed slot 407B. Slot 407A is configured to receive a first high temperature vapor cell 408A and a first set of low thermal conductivity mounting structures 412A and 412B, and may be secured at an axial end using, for example, first axial end 404A shown in FIG. 4A. Slot 407B is configured to receive a second vapor cell 414B and a second set of low thermal conductivity mounting structures 412C and 412D. In some examples, planar support 406 is a mid-plane planar support coupled to each radial wall of vacuum envelope frame 402. Planar support 406 may be configured to position one or more components of an atomic sensor within vacuum envelope 400 of FIG. 4A and maintain alignment of the one or more components. For example, planar support 406 may form a rigid optical bench on which to position optical components, such as vapor cells 408, one or more optics 409A and 409B and laser 426 (shown in FIG. 4C).

The one or more sets of low thermal conductivity mounting structures 412A, 412B, 412C, 412D ("mounting structures 412" and "mounting structure 412") are configured to position the one or more high temperature vapor cells 408 on planar support 406. Each mounting structure 412 includes a support 414A or 414B ("supports 414" and "support 414") configured to couple to vacuum envelope 400 via planar support 406. Each mounting structure 412 includes a mount 416A or 416B contacting high temperature vapor cell 408 and a corresponding support 414. Mount 416 includes a first axial surface that includes a first set of projections configured to interface with a first set of cavities of high temperature vapor cell 408 and a second axial surface that includes a second set of projections configured to interface with the second set of cavities of the corresponding support 414. Supports 414 and mounts 416 are positioned such that the first and second sets of projections for each mount 416 align and/or mate with the first and second sets of cavities of a corresponding support 414. Shielding panels 410A and 410B may be positioned around vapor cells 408A and 408B, respectively.

Figure 4C:
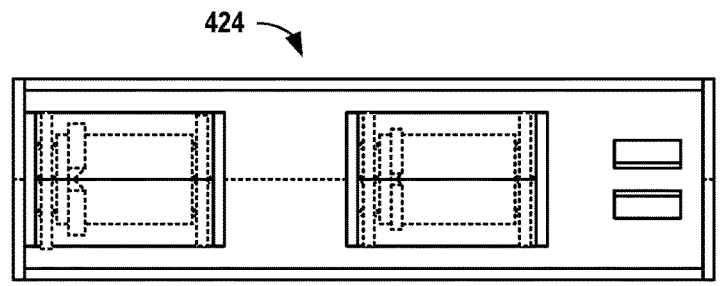
FIG. 4C is a side view diagram illustrating an assembled assembly, in accordance with examples discussed herein.

FIG. 4C is a side view diagram illustrating an assembled assembly 424, in accordance with examples discussed herein. Once positioned within vacuum envelope 400, planar support 406 is configured to extending along an axis of assembly vacuum envelope 400 and across the axis of vacuum envelope 400.

Figure 5:
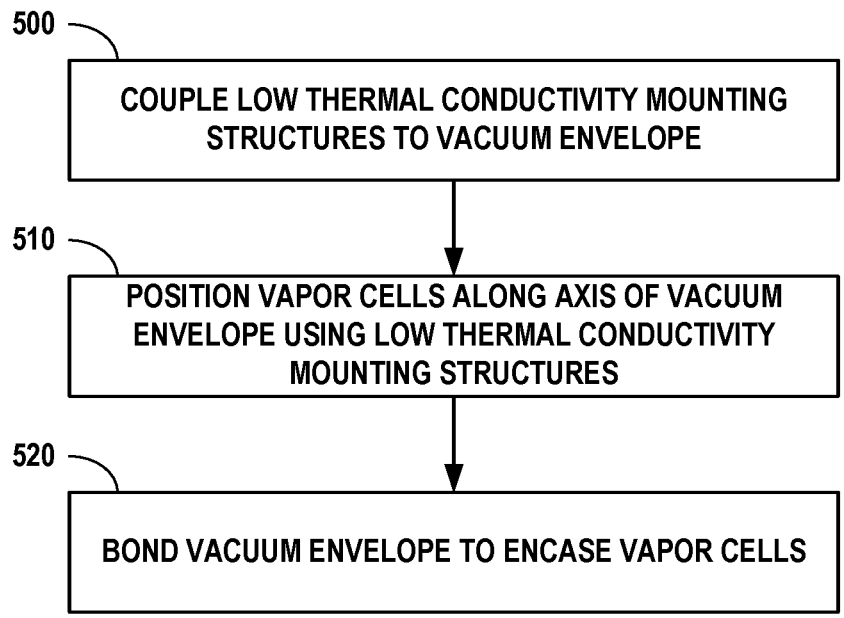
FIG. 5 is a flowchart of an example technique for assembling an assembly, in accordance with examples discussed herein.

FIG. 5 is a flowchart of an example technique for assembling an assembly, in accordance with examples discussed herein. FIG. 5 will be described with respect to FIGS. 4A-4C; however, the example technique of FIG. 5 may be used to assemble other assemblies of vapor cells.

The method of FIG. 5 includes coupling one or more sets of low thermal conductivity mounting structures 412 to vacuum envelope 400 (500). In some examples, coupling mounting structures 412 to vacuum envelope 400 may involve coupling mounting structures 412 to planar support 406. For example, as shown in FIG. 4B, mounting structures 412 may be configured to fit into slots 407A and 407B and clamp vapor cells 408A and 408B. In other examples, such as assembly 100 of FIGS. 1B and 1C, coupling mounting structures 114 to vacuum envelope 100 may include coupling mounting structures 114 to a radial side (e.g., perpendicular to axis 118) of planar support 116. For example, mounting structure 114 may be coupled to planar support using an adhesive or other bonding mechanism.

The method of FIG. 5 includes positioning one or more high temperature vapor cells 408A and 408B along an axis of vacuum envelope 400 using the one or more sets of low thermal conductivity mounting structures 412 (510). In some examples, such as examples in which planar support 406 functions as an optical bench, positioning vapor cells 408A and 408B may involve positioning vapor cells 408A and 408B in slots 407A and 407B of planar support 406, securing vapor cells 408A and 408B to planar support 406 using mounting structures 412, and positioning planar support 406 within vacuum envelope 400.

The method of FIG. 5 includes bonding one or more walls of vacuum envelope 400 to encase the one or more high temperature vapor cells 408 in vacuum envelope 400 (520). For example, axial ends 404A and 404B may be secured to vacuum envelope frame 404, such that components positioned on planar support 406 may be secured within vacuum envelope 400. A variety of techniques may be used to bond the one or more walls of vacuum envelope 400 including, but not limited to, anodic bonding, adhesion, and the like.

In some examples, the method of FIG. 5 includes anodically bonding one or more walls of vacuum envelope 400. To anodically bond vacuum envelope 400, sides of vacuum envelope may be polished and an outer substrate may be deposited on vacuum envelope 400 to enclose vacuum envelope 400. In some examples, the method of FIG. 5 includes bonding one or more walls of vacuum envelope 400 using an adhesive. In some examples, the method of FIG. 5 may include establishing a vacuum in vacuum envelope 400. For example, a vacuum pump may be fluidically coupled to vacuum envelope 400, such as through tip-off connection 122 of FIG. 1B. The vacuum pump may be operated to create a vacuum in vacuum envelope 400, after which tip-off connection 122 may be sealed.

Figure 6:
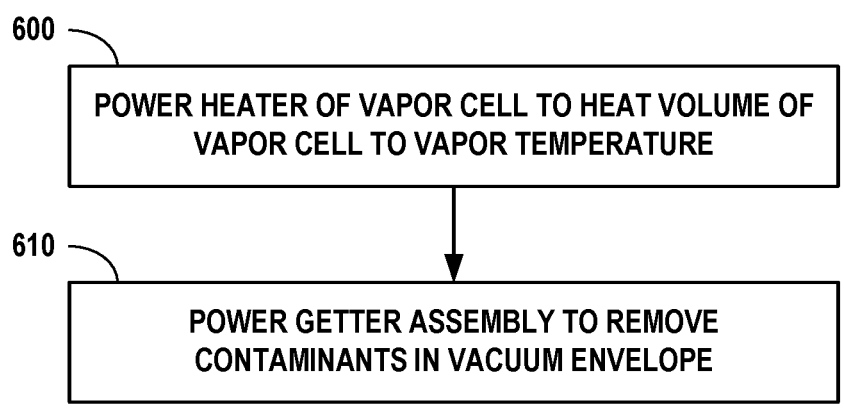
FIG. 6 is a flowchart of an example technique for operating an assembly, in accordance with examples discussed herein.

Assemblies described herein may be used in atomic sensors to operate the atomic sensor using relatively low amounts of power. FIG. 6 is a flowchart of an example technique for operating an assembly, in accordance with examples discussed herein. FIG. 6 will be described with respect to FIG. 1A; however, the technique of FIG. 6 may be used to operate other assemblies.

The technique of FIG. 6 includes powering a heater of high temperature vapor cell 104 to heat a volume of high temperature vapor cell 104 to a vapor temperature (600). For example, power may be supplied to one or more heaters in vapor cell 104 to heat vapor cell 104 to a described temperature. In some examples, the vapor temperature may be greater than 100° C. As described in FIG. 1B, vapor cells 104 are positioned along axis 118 of vacuum envelope 102 using one or more sets of low thermal conductivity mounting structures 114 coupled to vacuum envelope 102. At least partially as a result of low thermal conductivity mounting structures 114, a relatively low amount of heat may be transmitted from vapor cells 104 to an exterior of vacuum envelope 102 through mounting structures 114. In some examples, a difference between the vapor temperature and a temperature of an exterior of vacuum envelope 102 in a room temperature environment may be greater than about 40° C.

The technique of FIG. 6 includes powering getter assembly 110 to remove contaminants in vacuum envelope 102 to maintain a vacuum (610). In some examples, a pressure of the vacuum is less than about $10^{-2}$ torr, such as less than about $10^{-6}$ torr. In some examples, getter assembly 110 may be powered by at least one of inductive heating, laser heating, or resistive heating. As one example, resistive heating may involve process whereby the temperature of a material in vapor cell 104 increases due to its ability to convert electricity into heat as a result of resistance to the electrical current flowing through it. As another example, induction heating may involve a process that relies on induced electrical currents within a material in vapor cell 104 to raise the temperature of the material and thus, produce heat. As another example, laser heating may involve concentrating light to produce a small spot of intense heat energy.

Experimental and Simulated Examples

Figure 7A:
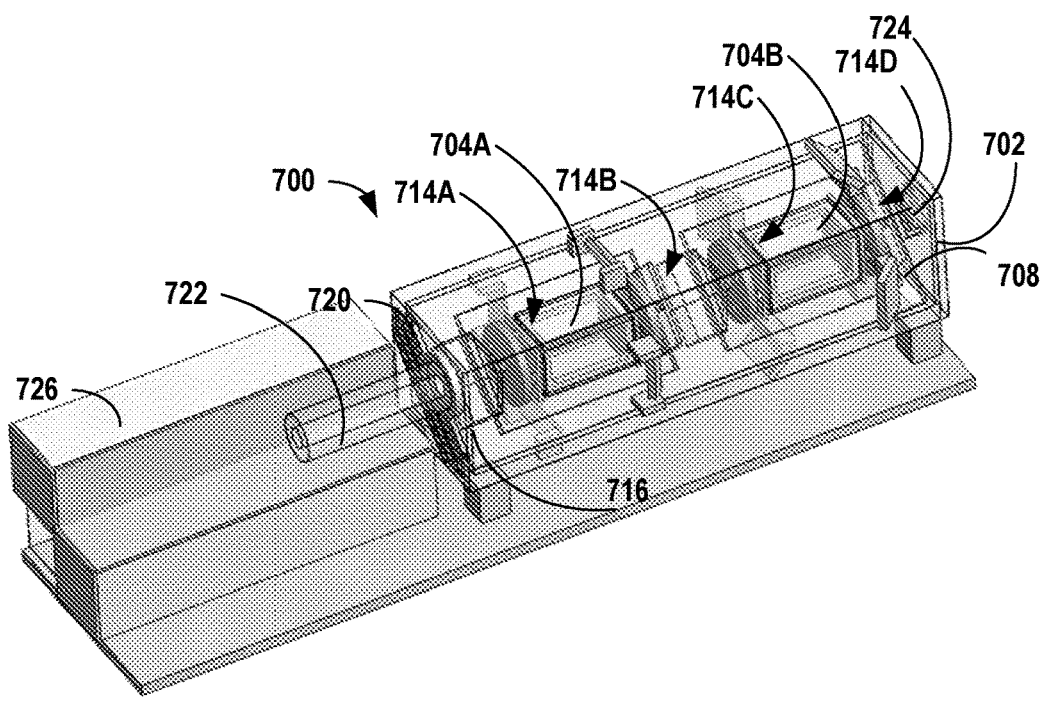
FIG. 7A is a computer aided design model illustrating an example sensor, in accordance with examples discussed herein.

FIG. 7A is a computer aided design model illustrating an example sensor, in accordance with examples discussed herein. Assembly 700 may be configured similar to assembly 100 of FIGS. 1A-1C. Assembly 700 includes one or more high temperature vapor cells 704A and 704B positioned along an axis of assembly 700. A vacuum envelope 702 encases the one or more high temperature vapor cells 704A and 704B. In the example of FIG. 7A, assembly 700 includes vacuum envelope 702 independently packaged from laser subassemblies 726 (vacuum or low pressure gas), to allow for external optics 708 to align lasers within laser subassemblies 726 in and out of vacuum envelope 702. Assembly 700 may have an outer volume of about 3 cm×3 cm×11 cm, and may include all lasers (pump and probe), optics 708, and dual vapor cells 704A and 704B within a 3 centimeter baseline. Such sensor integration may allow practical scaling of a plurality (e.g., more than 100) of sensors into large-scale sensor arrays. Vacuum envelope 702 may include a vacuum attachment 722 configured to attach to a vacuum pump or getter assembly (e.g., getter assembly 110 of FIG. 1A). In the example of FIG. 7A, assembly 700 includes a getter assembly 724 positioned on vacuum envelope 702.

One or more sets of low thermal conductivity mounting structures 714A, 714B, 714C, 714D are coupled to vacuum envelope 702. Each set of low thermal conductivity mounting structures 714A, 714B, 714C, 714D is configured to position a corresponding one of the high temperature vapor cells 704A or 704B within vacuum envelope 702. Each low thermal conductive mounting structure 714A, 714B, 714C, 714D includes a kinematic mount and contact points (e.g., 3 beads) with a degree of freedom to align to reduce conductive heat loss through those contact points. In one example, glass can be used. Each set of low thermal conductivity mounting structures 714A and 714B, 714C and 714D, operate as a clamp to mechanically stabilize a corresponding vapor cell 704A or 704B, and include one side that is relatively flexible and another side that is relatively rigid. The contact points of the kinematic mounts may fit into the cavity/holes in the supports.

Mounting structures 714A, 714B, 714C, 714D may be inserted into a bench support 716. Bench support 716 may provide assembly 700 with mechanical support so there is minimal movement of vapor cells 704 within assembly 700 for optical applications. Assembly includes optics 708 to direct laser beams into vapor cells 704A and 704B. Vapor cells 704A and 704B and/or vacuum envelope 702 may include windows. Vapor cells 704A and 704B may include shields (not shown) to reflect the heat loss from the cell.

Figure 7B:
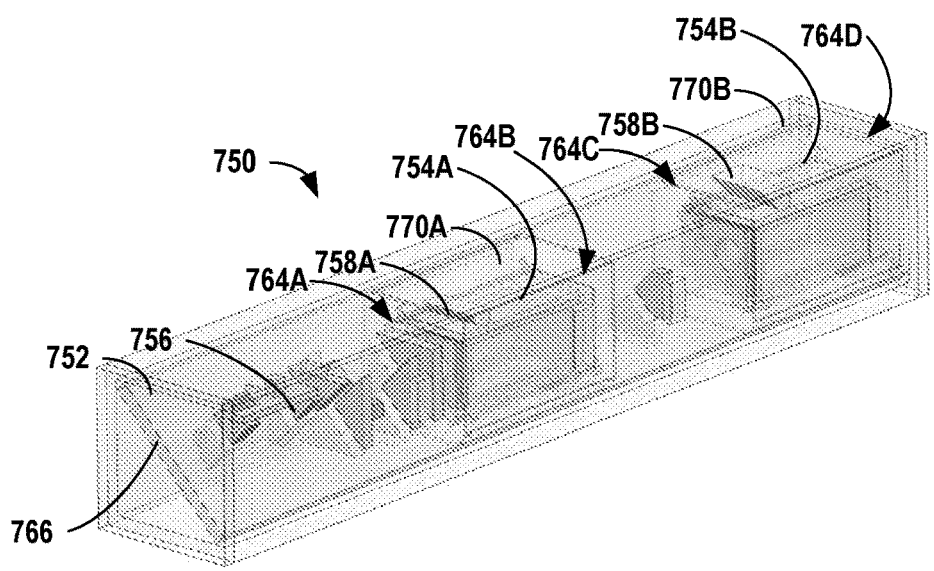
FIG. 7B is a computer aided design model illustrating an example sensor, in accordance with examples discussed herein.

FIG. 7B is a computer aided design model illustrating an example sensor, in accordance with examples discussed herein. Assembly 750 may be configured similar to assembly 150 of FIGS. 1D-1F. Assembly 750 includes one or more high temperature vapor cells 754A and 754B positioned along an axis of assembly 750. A vacuum envelope 752 encases the one or more high temperature vapor cells 754A and 754B and one or more lasers 776. Assembly includes a single layer of shielding 770A and 770B with patterned gold shield on glass plates. Shielding 770A and 770B may be manufactured from 0.2 mm glass with patterned gold on both sides. Shielding 770A and 770B encloses glass or silicon wedge mirrors 758A and 758B mounted directly on cell windows of vapor cells 754A and 754B.

Vapor cells 754A and 754B each sit in a slot in an optical bench 766 and contacts the end of the piece of glass. Vapor cells 754A and 754B may be sandwiched by mounting structures 764A, 764B, 764C, and 764D that include thin (e.g. about 0.5 millimeters) anchor plates, such as mounts 262 of FIG. 2B, secured to a base plate, such as support 264 of FIG. 2B. Mounting structures 764A, 764B, 764C, 764D include no beads, but include machined regions as low thermal conductivity contact supports. Assembly 750 may operate at 150 mW per vapor cell 754A or 754B, for a total power of 300 mW per assembly 750.

Figure 8A:
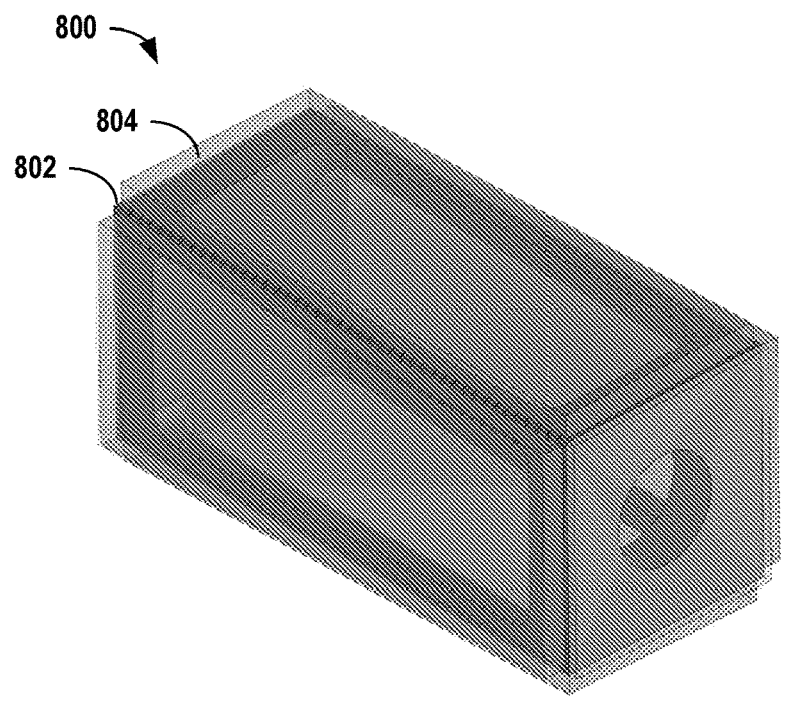
FIG. 8A is a schematic diagram of an example fabricated vapor cell, in accordance with examples discussed herein.

FIG. 8A is a schematic diagram of an example fabricated vapor cell 800, in accordance with examples discussed herein. Vapor cell 800 includes a frame 802 having 1 millimeter thick ribs and glass windows 804 bonded directly to the frame. An inner volume of vapor cell is about 5 mm×5 mm×10 mm, while an outer volume of vapor cell is about 8 mm×8 mm×12.5 mm. Dimensions of vapor cell 800 are 8 mm×8 mm×13 mm. A thickness of windows 804 are 0.5 mm. Vapor cell 800 was machined from high-resistivity silicon, (e.g., silicon having a resistance greater than about 20,000 Ohm-cm) and polished into silicon-based frame 802. Glass windows 804 were anodically bonded frame 802. Vapor cell 800 was filled and bonded in situ in an ultra-high vacuum chamber.

Figure 8B:
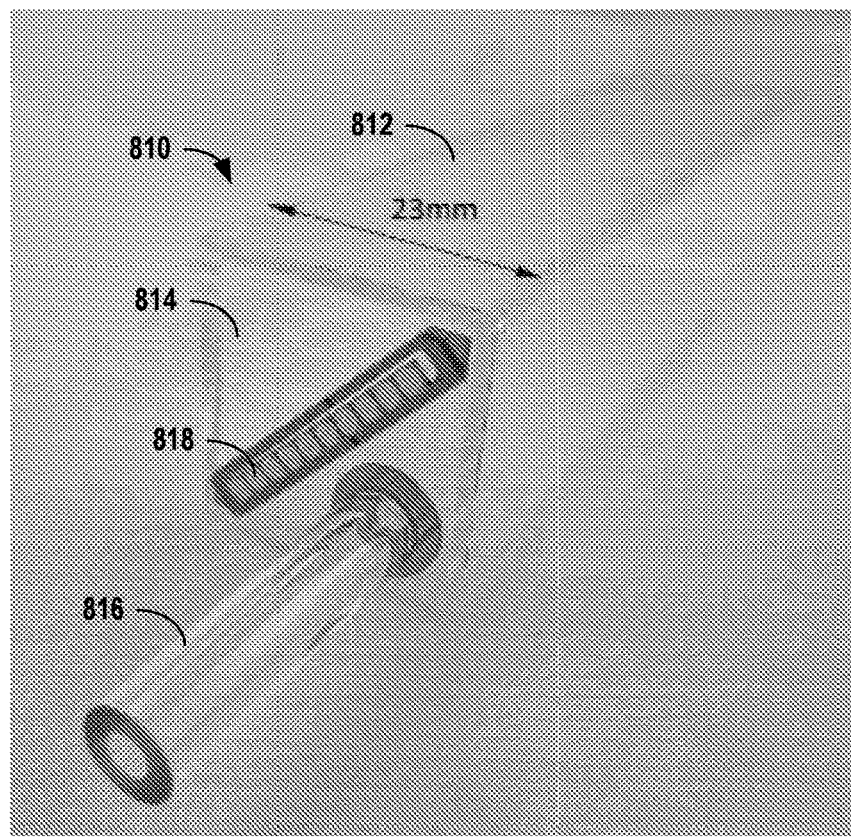
FIG. 8B is a photograph of an example vacuum envelope, in accordance with examples discussed herein.

FIG. 8B is a photograph of an example vacuum envelope 810, in accordance with examples discussed herein. Vacuum envelope 810 is configured to encase two vapor cells. Vacuum envelope 810 includes a vacuum envelope frame 812 that includes lateral walls and axial ends 814, at least one of which includes integrated feed-throughs 818 and tip-off stem 816 for vacuum processing. Vacuum envelope 810 has a cross-sectional dimension of about 23 mm.

Figure 8C:
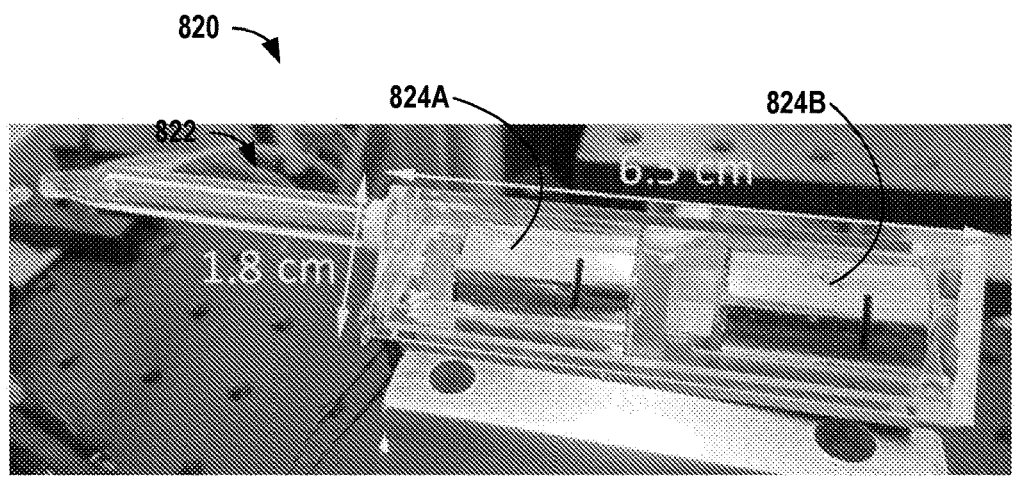
FIG. 8C is a photograph of an example assembly for an atomic sensor, in accordance with examples discussed herein.

FIG. 8C is a photograph of an example assembly 820 for an atomic sensor, in accordance with examples discussed herein. Assembly 820 include a vacuum envelope 822 and two vapor cells 824A and 824B enclosed in vacuum envelope 822. Vacuum envelope 822 has a cross-sectional dimension of about 18 mm and a length of about 65 mm.

Figure 8D:
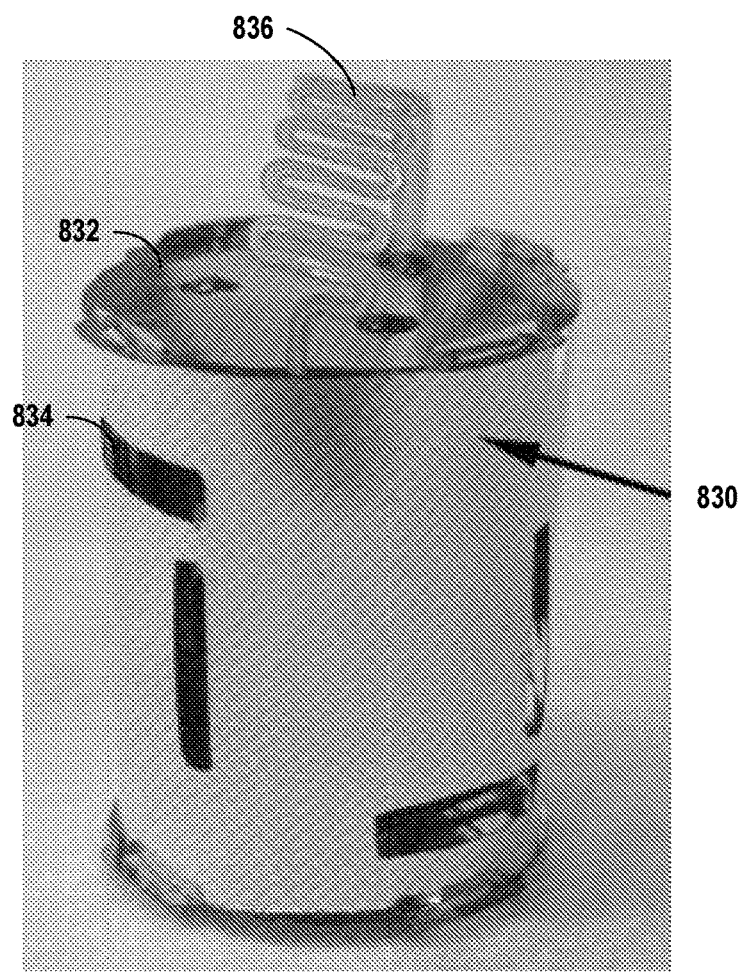
FIG. 8D is a photograph of an example shielded vapor cell, in accordance with examples discussed herein.

FIG. 8D is a photograph of an example shielded vapor cell 830, in accordance with examples discussed herein. Shielded vapor cell 830 includes a metallized polymer shield 832 wrapped around a vapor cell (e.g., vapor cell 800 of FIG. 8A). In the example of FIG. 8D, the radiation shield is patterned. Radiation shield 832 includes one or more cutouts 834 configured to allow light from one or more photon sources, such as pump or probe lasers. Shielded vapor cell 830 includes a power cable for supplying power to one or more heaters coupled to vapor cell 800.

Figure 8E:
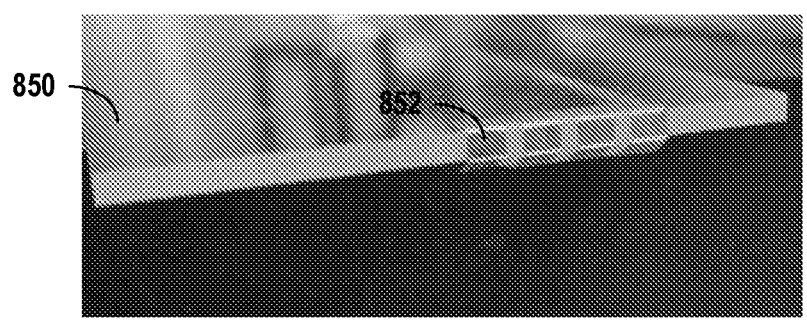
FIG. 8E is a photograph of a mid-plane bench, in accordance with examples discussed herein.

FIG. 8E is a photograph of a mid-plane bench 850, in accordance with examples discussed herein. Mid-plane bench 850 includes contacts 852 configured to be in electrical communication with feedthroughs (e.g., feedthroughs 818 of FIG. 8B) for receiving power from outside a vacuum envelope.

Figure 8F:
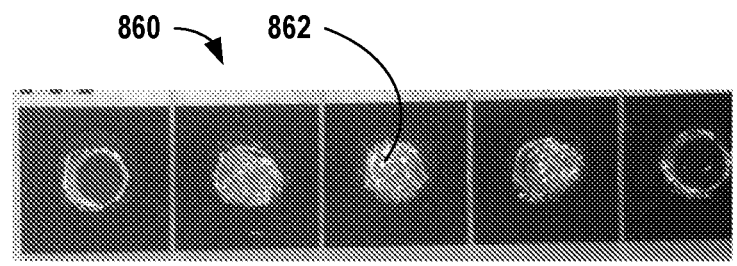
FIG. 8F is a photograph of an example feedthrough interface, in accordance with examples discussed herein.

FIG. 8F is a photograph of an example feedthrough interface 860, in accordance with examples discussed herein. Integrated low profile electrical feed-throughs 862 may be configured to receive power from electronics outside a vacuum envelope. Feed-throughs 862 may be formed from a copper or gold alloys, such as BeCu or BeAu.

Figure 9A:
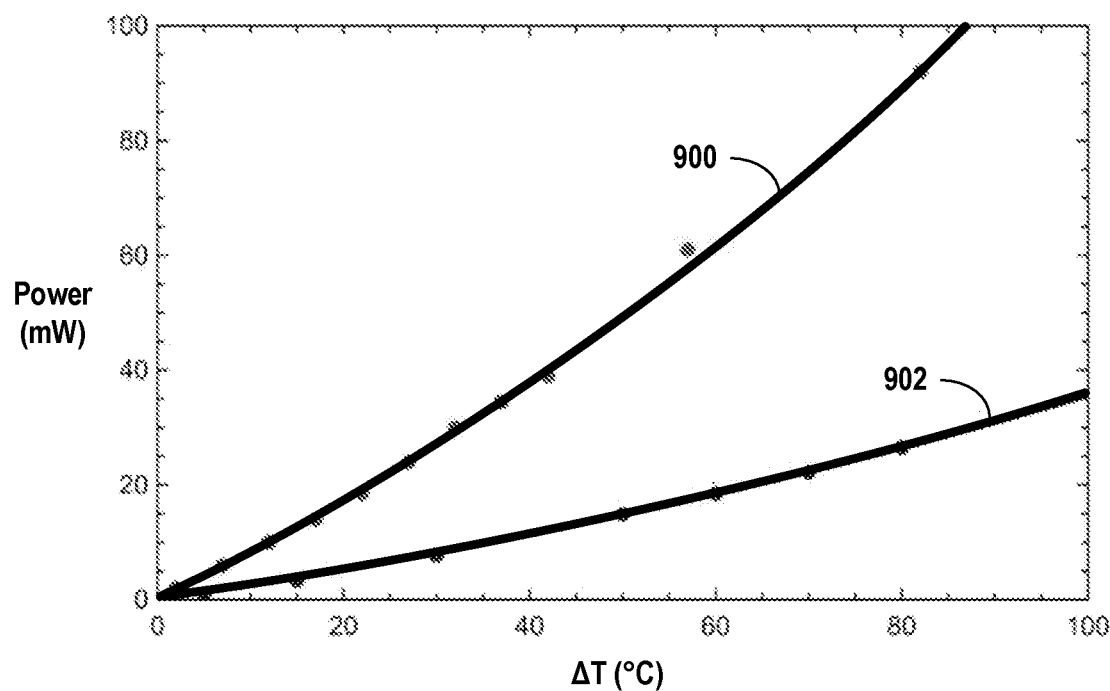
FIG. 9A is a graph of power vs. temperature differential for an example single cell assembly, in accordance with examples discussed herein.

FIG. 9A is a graph of power vs. temperature differential for an example single cell assembly, in accordance with examples discussed herein. A first test assembly and a second test assembly were fabricated and assembled. FIG. 9A shows performance of the first test cell assembly 900 and the second test cell assembly 902.

The first test cell assembly included low thermal conductivity mounting structures having four bead mechanical isolation, a vapor cell manufactured from Pyrex and having dimensions of 11 mm×11 mm×19 mm, platinum heaters, a single layer double-sided gold coated radiation shield with beam cutouts. The first test assembly was tested in a vacuum chamber having a pressure less than $1\times10^{-6}$ torr. The first test assembly had a per-cell thermal resistance of about 3,000 K/W and an overall effective emissivity of about 0.18.

Figure 9B:
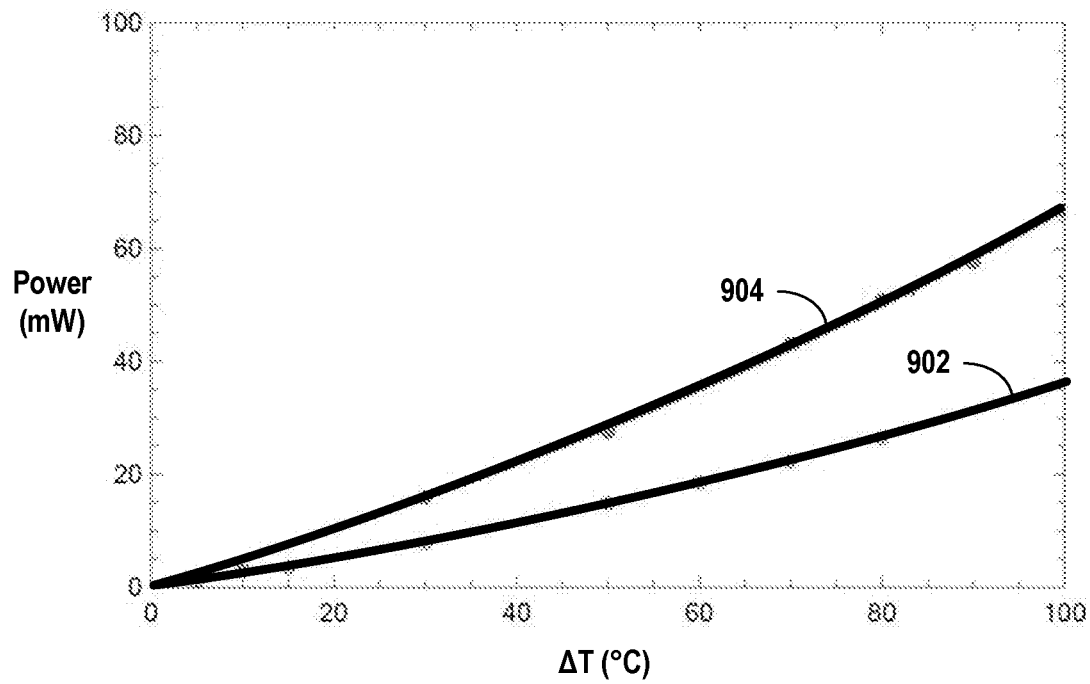
FIG. 9B is a graph of power vs. temperature differential for an example double cell assembly, in accordance with examples discussed herein.

The second test assembly included low thermal conductivity mounting structures having 10 bead mechanical isolation, a vapor cell manufactured from silicon and having dimension of 8 mm×8 mm×13 mm, Kapton heaters, and a triple layer double-sided gold coated radiation shield with beam cutouts. The second test assembly was tested in a glass cuvette having a pressure less than $1\times10^{-6}$ torr. The second test assembly had a per-vapor-cell thermal resistance of about 13,000 K/W and an overall effective emissivity of about 0.05. Improvements to the cell construction from the first test assembly to the second test assembly lowered the overall power consumption to about 25 mW per cell, measured with an 80° C. differential from room temperature FIG. 9B is a graph of power vs. temperature differential for an example double cell assembly, in accordance with examples discussed herein. A third test assembly was fabricated and assembled. FIG. 9B shows performance of the second test cell assembly 902 and the third test assembly 904. The third test cell assembly included low thermal conductivity mounting structures having machined mechanical isolation, two vapor cells manufactured from silicon, Kapton heaters, and a multi-layer patterned gold coated radiation shielding. Vacuum processing of the test assembly included firing of non-evaporable getter to maintain sub-mTorr vacuum levels. The measured performance per cell for third test assembly is shown in FIG. 9B, with each vapor cell consuming about 50 mW at 100° C. operating temperature. This is somewhat degraded from the second test cell assembly 902 due to minor alterations in the mechanical structure to increase rigidity of the vapor cells, as well as less efficient radiation shielding due to the patterned gold surface. The third test assembly was tipped off and running at vapor cell operating temperatures without sign of vacuum degradation.

Figure 10:
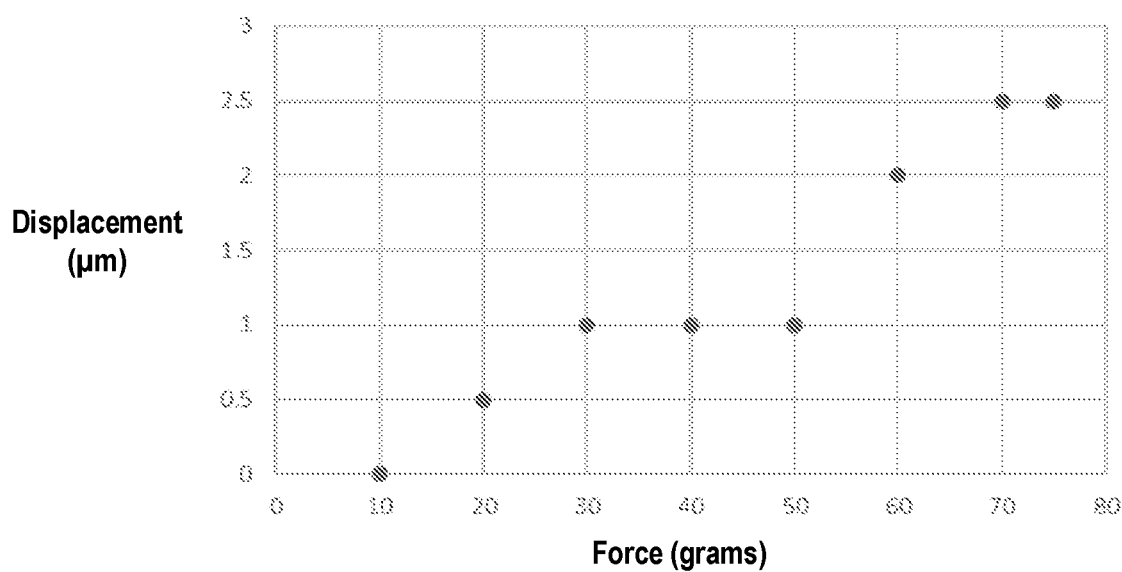
FIG. 10 is a graph of displacement vs force for an example assembly, in accordance with examples discussed herein.

FIG. 10 is a graph of displacement vs force for an example assembly, in accordance with examples discussed herein. The rigidity of vapor cells in the third test assembly described in FIG. 9B was tested. In this test, displacement of the vapor cell in response to, and as a function of, mechanical force was measured by a laser profilometer. With a force of up to 75 grams (e.g., about 100 times the mass of the vapor cell), the vapor cell was only displaced by up to about 3 µm.

What is claimed is:

1. An assembly, comprising:
one or more high temperature vapor cells positioned along an axis of a vacuum envelope;
the vacuum envelope encasing the one or more high temperature vapor cells; and
one or more sets of low thermal conductivity mounting structures coupled to the vacuum envelope,
wherein the vacuum envelope further comprises a planar support extending along the axis of the vacuum envelope and across the axis of the vacuum envelope, and
wherein each set of the one or more sets of low thermal conductivity mounting structures is configured to position a corresponding one of the one or more high temperature vapor cells on the planar support within the vacuum envelope.

2. The assembly of claim 1, wherein each set of the one or more sets of low thermal conductivity mounting structures is configured to contact less than one percent of an outer surface area of the corresponding one of the one or more high temperature vapor cells or a vapor cell assembly that includes one of the one or more high temperature vapor cells.

3. The assembly of claim 1, wherein each set of the one or more sets of low thermal conductivity mounting structures is configured to contact the corresponding one of the one or more high temperature vapor cells using a recessed fit.

4. The assembly of claim 3, wherein each set of the one or more sets of low thermal conductivity mounting structures comprises one or more projections configured to contact an axial end of the corresponding one of the one or more high temperature vapor cells.

5. The assembly of claim 4, wherein the one or more projections comprise at least one of spheres, cubes, rectangular prisms, cylinders, or pyramids.

6. The assembly of claim 5, wherein the one or more projections are unfixed to a corresponding support of a low thermal conductivity mounting structure of the one or more sets of low thermal conductivity mounting structures.

7. The assembly of claim 1, wherein each set of the one or more sets of low thermal conductivity mounting structures comprises a rigid mount contacting a first axial end of the corresponding one of the one or more high temperature vapor cells and a flexible mount contacting a second axial end of the corresponding one of the one or more high temperature vapor cells, wherein the flexible mount is configured to compress in response to an axial force.

8. The assembly of claim 1,
wherein an axial end of each of the one or more high temperature vapor cells comprises a first set of cavities, and
wherein each mounting structure of each set of the one or more sets of low thermal conductivity mounting structures comprises:
a support coupled to the vacuum envelope, wherein the support includes an axial surface comprising a second set of cavities; and
a mount contacting the corresponding one of the one or more high temperature vapor cells and a corresponding support, wherein the mount comprises:
a first axial surface comprising a first set of projections configured to interface with the first set of cavities of the corresponding one of the one or more high temperature vapor cells; and
a second axial surface comprising a second set of projections configured to interface with the second set of cavities of the corresponding support.

9. The assembly of claim 1, wherein each of the one or more high temperature vapor cells comprises a radiation shield.

10. The assembly of claim 9, wherein the radiation shield comprises one or more gold layers on a polymer or glass substrate.

11. The assembly of claim 9, wherein the radiation shield comprises one or more openings configured to receive light from one or more optics.

12. The assembly of claim 1, wherein the planar support is a mid-plane planar support coupled to more than one perimeter wall of the vacuum envelope.

13. The assembly of claim 1, further comprising one or more optics encased in the vacuum envelope, wherein the one or more optics are configured to transmit light into each of the one or more high temperature vapor cells.

14. The assembly of claim 13, further comprising a photon source encased in the vacuum envelope and coupled to the vacuum envelope, wherein the photon source is configured to emit light into the one or more optics.

15. A method comprising:
coupling one or more sets of low thermal conductivity mounting structures to a planar support within a vacuum envelope, wherein the planar support extends along an axis of the vacuum envelope and across the axis of the vacuum envelope;
positioning one or more high temperature vapor cells along the axis of the vacuum envelope using the one or more sets of low thermal conductivity mounting structures; and
bonding one or more walls of the vacuum envelope to encase the one or more high temperature vapor cells in the vacuum envelope.

16. The method of claim 15, further comprising bonding the one or more walls of the vacuum envelope by at least one of anodic bonding or an adhesive.

17. A method comprising:
powering a heater of a high temperature vapor cell to heat a volume of the high temperature vapor cell to a vapor temperature,
wherein the high temperature vapor cell is positioned along an axis of a vacuum envelope using one or more sets of low thermal conductivity mounting structures coupled to a planar support within the vacuum envelope, and
wherein the planar support extends along the axis of the vacuum envelope and across the axis of the vacuum envelope.

* * * * *